US011872572B2

(12) United States Patent
Fuller et al.

(10) Patent No.: US 11,872,572 B2
(45) Date of Patent: Jan. 16, 2024

(54) MOBILE WATER DELIVERY DEVICE

(71) Applicant: WET, Sun Valley, CA (US)

(72) Inventors: Mark W. Fuller, Sun Valley, CA (US); James W. Doyle, Sun Valley, CA (US)

(73) Assignee: WET, Sun Valley, CA (US)

( * ) Notice: Subject to any disclaimer, the term of this patent is extended or adjusted under 35 U.S.C. 154(b) by 0 days.

(21) Appl. No.: 16/137,216

(22) Filed: Sep. 20, 2018

(65) Prior Publication Data

US 2019/0091716 A1 Mar. 28, 2019

Related U.S. Application Data

(60) Provisional application No. 62/561,162, filed on Sep. 20, 2017.

(51) Int. Cl.

*B05B 17/08* (2006.01)
*B63B 35/00* (2020.01)
*B05B 12/06* (2006.01)

(52) U.S. Cl.

CPC .............. *B05B 17/08* (2013.01); *B63B 35/00* (2013.01); *B05B 12/06* (2013.01)

(58) Field of Classification Search

CPC ....... B05B 17/08; B05B 17/085; B05B 15/60; B05B 15/62; B05B 12/06; B05B 12/002; B05B 13/005; B63B 38/00; B63B 2035/008

USPC ...................... 239/17–23, 170.172, 725, 146

See application file for complete search history.

(56) References Cited

U.S. PATENT DOCUMENTS 2,745,697 A * 5/1956 Pearse ..................... B05B 17/08 239/20
4,086,306 A * 4/1978 Yoshinaga ............ F04D 13/066 261/93
5,884,213 A * 3/1999 Carlson .................. B63H 25/42 701/470
6,053,423 A * 4/2000 Jacobsen ................. B05B 17/08 239/18
6,131,819 A * 10/2000 Fuller ..................... B05B 17/08 239/20
6,263,826 B1 * 7/2001 Key ........................ B63B 17/00 114/343
7,004,801 B2 * 2/2006 Bryham ................ B60F 3/0007 440/12.54
7,077,338 B1 * 7/2006 Williamson ............ B63B 17/00 114/343
7,927,175 B2 * 4/2011 Coffey .................. F41B 9/0025 222/79
2002/0179728 A1 * 12/2002 Beidokhti ............... B05B 17/08 239/20
2006/0163375 A1 * 7/2006 Skluzacek ............... B05B 17/08 239/18

(Continued)

FOREIGN PATENT DOCUMENTS

KR 10-1022345 3/2011
KR 10-2012-0066168 6/2012

*Primary Examiner* — Cody J Lieuwen

(74) *Attorney, Agent, or Firm* — Maceiko IP

(57) ABSTRACT

A device to move and control a water shooter is described. The device may contain features that allow the device to travel along the surface of a reservoir with a water shooter attached. The device may be free from a physical connection to the bottom or the sides of the reservoir so that unique water effects may be achieved.

15 Claims, 31 Drawing Sheets

(56) References Cited

U.S. PATENT DOCUMENTS

| | | | | |
|---|---|---|---|---|
| 2009/0289126 | A1* | 11/2009 | Claas | B05B 3/14 239/1 |
| 2014/0263715 | A1* | 9/2014 | Fuller | B05B 17/08 239/18 |
| 2014/0312139 | A1* | 10/2014 | Fuller | B05B 13/04 239/17 |

* cited by examiner

MOBILE WATER DELIVERY DEVICE

CROSS-REFERENCE TO RELATED APPLICATION

This application claims the benefit of U.S. Provisional Application No. 62/561,162, filed Sep. 20, 2017, the contents of which are incorporated herein by reference.

FIELD OF THE INVENTION

The current invention generally relates to water delivery devices that provide a stream of water, including devices that emit water streams as they move around a body of water. The current invention also relates to the use of such devices with fountain and lighting displays.

BACKGROUND OF THE INVENTION

Various types of water displays exist, and many of them include water delivery devices that emit streams of water. Oftentimes, the water display is located in a reservoir having a floor and walls. Before the reservoir is filled with water, a network of water delivery devices may be attached to the bottom of the reservoir in a variety of formations. This network may include the water delivery devices themselves, as well as supporting lines such as electrical, water supply and other lines. After the reservoir is filled, water surrounds the water delivery devices, and the water streams emitted by the water delivery devices may generally be emitted above the surface of the reservoir.

These existing water delivery devices may provide dramatic visual effects, but if they are fixed to the bottom of the water reservoir, there is some limitation of the visual effects they can produce. For example, fixed water delivery devices typically cannot provide the appearance of a stream of water that moves to different locations in the reservoir.

Other displays may include water delivery devices that may be mounted on tracks beneath the water surface such that the water delivery devices may move along the tracks while emitting water streams. In these cases, the water delivery devices may indeed move about, but may be limited to moving along the predefined tracks and are thus somewhat limited in their available movement. One example of this type of water display is more fully described in U.S. patent application Ser. No. 14/212,106, filed Mar. 14, 2014, the contents of which are expressly incorporated by reference as if fully set forth herein.

Accordingly, there is a need for a water delivery device for use in a water display that may move about a reservoir without being constrained by fixed tracks or other guides, so that the water streams emitted by the devices may provide physical locations. There is also a need for a water display having water delivery devices that may be moved as such during a performance to enhance the display's visual effects.

SUMMARY OF THE INVENTION

In a first aspect of the invention, a mobile water delivery device that may move in or on a body of water without being constrained by a physical connection to the ground is described. When used in connection with a fountain display, it is preferred that the mobile device may travel from location to location in the display without being attached to the reservoir floor to add to the overall visual impression. The water delivery device may float on the water and/or be submerged or partially submerged therein as it moves.

Another aspect of the invention involves the use of a pontoon structure to support the water delivery device. For example, two pontoons may be configured as a catamaran and the water delivery device may be positioned on a platform between the pontoons, or in an area between the pontoons along with the propulsion assembly and other assemblies. The propulsion assemblies may include motors with propellers or water jets.

Other types of boat-like configurations may be used besides pontoons and catamarans. Accordingly, another aspect of the invention involves the use of other types of boats other than pontoon boats, such as single hull boats, additional multi-hull boats, boats with keels, submersibles and other types of water vehicles.

Another aspect of the invention involves steering the boat by controlling the angle of the propulsion assembly. Rudders may also be used to guide the boat.

Another aspect of the invention involves reaction plates or keels to add stability to the boat and to counteract the forces imparted by a water shot or other emission of water.

In another aspect of the current invention, counterweights and/or opposing forces may counteract the force imparted by a water shot or other emission of water. For example, the boat may include a bazooka-like device which fires simultaneously with the water shot. The bazooka shot may be directed in the opposite direction as the direction of the water shot so as to balance out or counteract the force of the water shot. In this manner, the boat may generally remain in a floating position and the direction of the water shot may be controlled.

Another aspect of the invention involves the use of shock absorbers or a counteracting mechanism to dampen and lessen the force imparted on the water delivery device by the shooting of the water stream or other emission of water. Alternatively, the invention may involve the use of the propulsion assembly and the rudders to offset the force exerted on the boat by the water shot or other emission of the water streams.

Another aspect of the invention involves the use of deployable support legs that may be lowered downward from the boat in order to engage the bottom of the reservoir to provide support to the boat while it emits water steams. The support legs may be deployed to engage with the bottom of the reservoir directly, may be deployed to leave a small gap between the bottom of the legs and the bottom of the reservoir and/or may include rollers.

Another aspect of the current invention involves the use of a gyroscope with the boat to add additional stability to the boat as it moves about the reservoir emitting water streams.

Yet another aspect of the invention involves the use of keels or reaction plates on the boat to counteract the forces applied to the boat due to the emission of water streams. In this way, the viscous drag of the water on the reaction plates may dampen effects of the forces applied.

Another aspect of the invention involves a controller unit that may control the emitting of water by the water delivery devices and the propulsion assembly of the boat. The controller may also control other elements of the boat such as the counter balance mechanisms, the support legs and the gyroscope.

Another aspect of the invention involves a guidance assembly that may include a GPS receiver to determine the location of the boat. The guidance assembly may also include information regarding the desired choreographed movement sequence of the boat so that it and the controller unit may guide the boat accordingly. In this way, the water delivery device may be controlled to move about and emit water streams in a choreographed manner as part of the overall display. The guidance system may receive control commands from a control tower in order to control the location and water streams in real time. In addition, the commands from the control tower may come from a human pilot, a controller or a combination of human pilot and controller.

Another aspect of the invention involves a multitude of water delivery devices and/or water vehicles moving about the reservoir in unison and in a choreographed fashion. In this manner, the current invention may enhance the overall visual effects of the display.

Another aspect of the current invention involves a guidance system that knows or otherwise determines the location, direction and speed of each vehicle within the display and then controls them all in unison in a choreographed fashion.

Another aspect of the current invention involves a collision detection and avoidance system such that potential collisions between different vehicles may be avoided.

Other aspects of the invention are discussed herein.

DETAILED DESCRIPTION OF THE PREFERRED EMBODIMENTS

Figure 1:
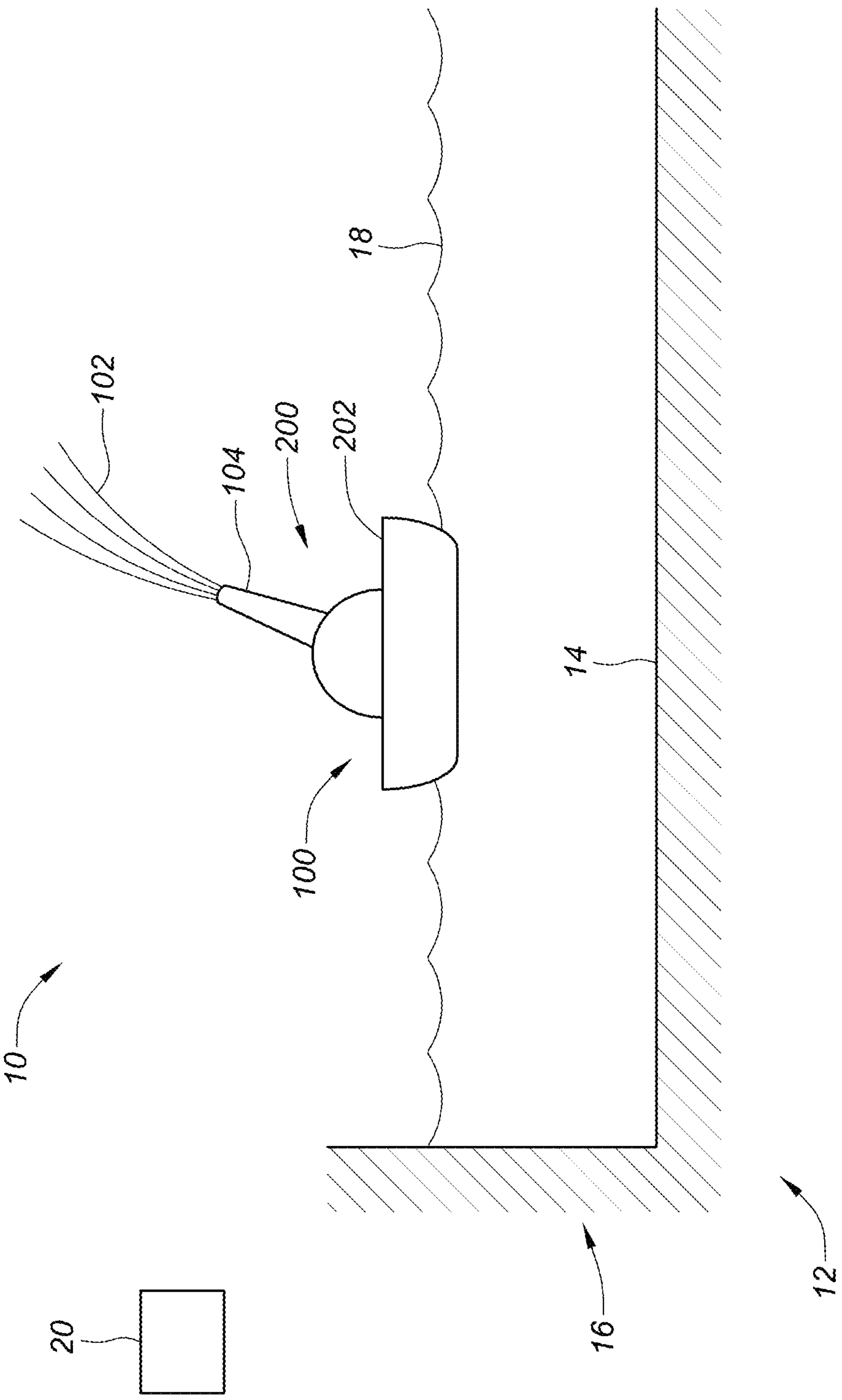
FIG. 1 is a side view of a water delivery device within a reservoir.

The following detailed description is not intended to limit the current invention. Alternate embodiments and variations of the subject matter described herein will be apparent to those skilled in the art.

The display 10 of the current invention and the visual effects that it may produce are now described with reference to the figures. Where the same or similar components appear in more than one figure, they are identified by the same or similar reference numerals.

In general, display 10 provides dramatic visual effects by including one or more water delivery devices 100 that may move about within a pool or reservoir 12 while emitting choreographed water streams. Display 10 may be installed or located near hotels, restaurants or public buildings, or in gardens, parks or amusement areas, or poolside or in other types of outdoor spaces. In addition, display 10 may also be installed within atriums, lobbies or in other indoor locations. As such, display 10 may provide an attraction to these buildings and spaces. Display 10 may also be included in existing water, fire and/or lighting displays to provide enhanced visual effects.

As shown in FIGS. 1-5, pool or reservoir 12 may include floor 14 and walls 16, and may be filled with water or another liquid that may have a top water surface 18. Water delivery devices 100 may each be configured with vehicle assembly 200, propulsion assembly 300, support assembly 400 and guidance assembly 500. Each of these assemblies will be described in sections below in relation to the various embodiments.

In a first embodiment, water delivery device 100 may be configured with vehicle assembly 200 that may include boat 202. Boat 202 may generally float on and travel along water surface 18 within reservoir 12 while water delivery device 100 may emit water stream 102 out of water nozzle 104.

An example of water delivery device 100 is more fully described in U.S. Ser. No. 14/134,983, filed Dec. 19, 2013, the contents of which are expressly incorporated by reference as if fully set forth herein. Other examples of water delivery device 100 are described in the following article, the contents of which are expressly incorporated by reference as if fully set forth herein: Making Water Dance, Jan. 9, 2003, Machine Design.com. The article may be found at: http://www.machinedesign.com/recreation/application-profile-motors-pumps-and-valves-make-water-dance. These devices may be provided by WET. An example of a movable water delivery device is described in U.S. Provisional Application Ser. No. 62/297,786, filed Feb. 19, 2016, the contents of which are expressly incorporated by reference as if fully set forth herein.

Figure 2A:
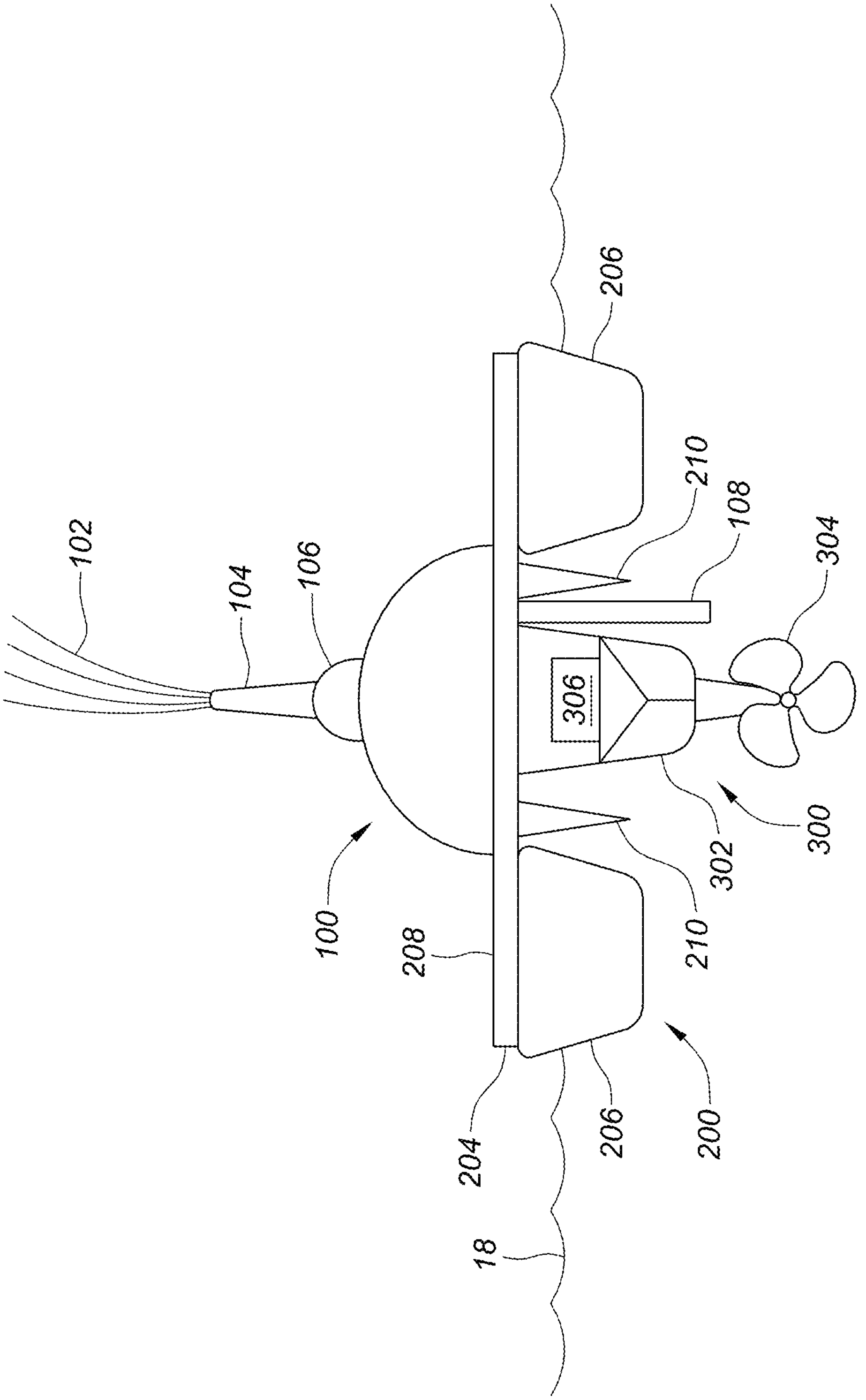
FIG. 2A is a rear view of a pontoon boat.
Figure 2B:
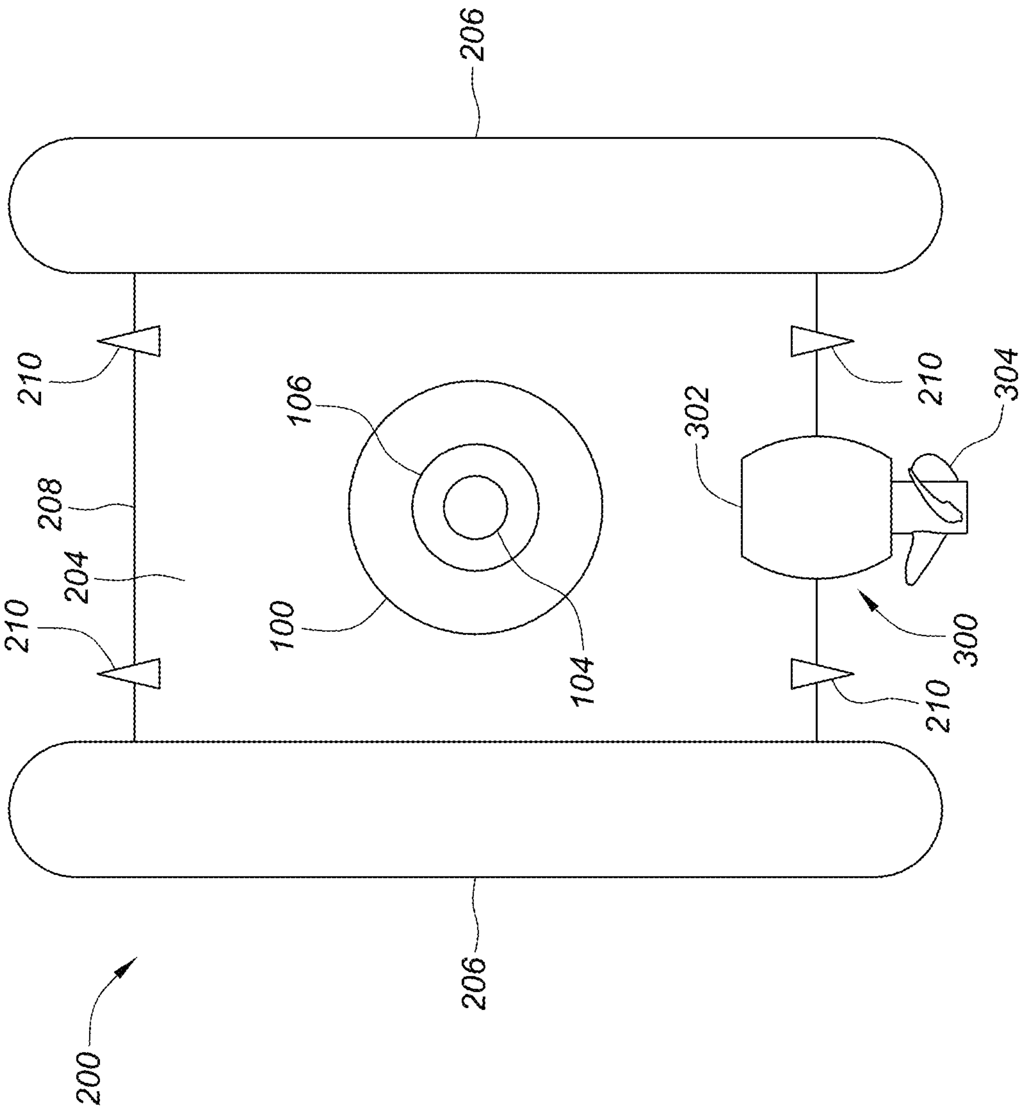
FIG. 2B is a top view of a pontoon boat.

In one embodiment of this type, boat 202 may comprise a catamaran or pontoon boat 204 as depicted in FIGS. 2A and 2B. FIG. 2A is a rear view of pontoon boat 204 while FIG. 2B is a top view. Pontoon boat 204 may include one or more pontoons 206 that may float on water surface 18 and/or may be partially submerged therein. Pontoons 206 may support top platform as shown. In one example, pontoon boat 204 may be six to eight feet long but other lengths may be used.

Water delivery device 100 may be configured on platform 208 such that nozzle 104 may emit water stream 102 into the air above water surface 18. In this way, pontoons 206 may provide lateral support to support platform 208 and water delivery device 100 while water delivery device emits water stream 102. In addition, while water delivery device 100 is depicted as being generally configured on the top surface of support platform 208, a portion or all of water delivery device 100 may also be configured in the area below support platform 208, in the area generally between pontoons 206 or in any other position or location with respect to pontoon boat 204. In this manner, boat 200 may have an overall lower center of gravity to help stabilize boat 200 during a water shot or other emission of water, and to help control the direction of water stream 102.

Nozzle 104 may be configured with movable mount 106 such that nozzle 104 may be controllably pointed to shoot water stream 102 in any direction with respect to water surface 18. In addition, water delivery device 100 may include a water pump that may receive water through water intake 108 and propel it out of nozzle 104 to form water stream 102. In this way, reservoir 12 may act as the water source to water delivery device 100.

Water intake 108 may extend below water surface 18 such that it may be immersed in the water to generally supply water to water delivery device 100 as necessary. While water intake 108 is depicted as a pipe that is slightly offset on the lower right side of water delivery device in FIG. 2A, water intake 108 may be any type of valve or other type of intake mechanism that may allow water to be provided to water delivery device 100. Also, intake 108 may be located and configured with water delivery device 100 and pontoon boat 204 in any position or location that adequately allows it to perform the water supply functions.

Pontoon boat 204 may also include propulsion assembly 300 that may comprise motor 302 and propeller 304. Motor 302 may receive power from battery unit 306 and may drive propeller 304 to spin in order to propel pontoon boat 204. Battery unit 306 may be configured between pontoons 206 or in any other position with respect to pontoon boat 204. It is preferred that one or more components of propulsion assembly be positioned lower, e.g., below the water surface 18 to provide a lower center of gravity.

In addition, motor 302 and propeller 304 may controllably pivot from side to side in order direct the outward force provided by propeller 304 in different directions such that pontoon boat 304 may be steered or otherwise guided. In addition, rudders 210 may be positioned as shown in FIGS. 2A and 2B or in any other position or configuration to provide guidance to pontoon boat 204. Rudders 210 may be stationary or may also controllably pivot from side to side in order to generally steer or guide pontoon boat 204. The control of motor 302, propeller 304 and rudders 210 in order to steer pontoon boat 204 will be described in later sections.

As an alternative to battery power, motor 302 may comprise or include a fuel engine that may run on fuel in addition to or instead of power provided by battery unit 306. Motor 302 may also run on solar power, wind power or on other types of power sources. Also, more than one motor 302 and propeller 304 may be utilized with pontoon boat 204.

Figure 2C:
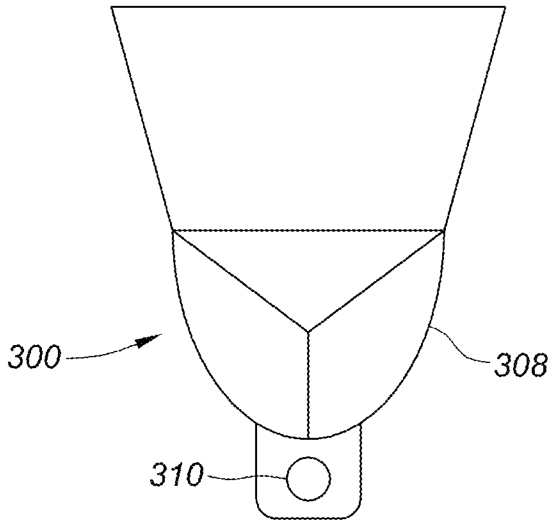
FIG. 2C is a side view of a water jet.

In another embodiment of this type as depicted in FIG. 2C, propulsion assembly 300 may include a water jet 308 to propel pontoon boat 206. In this embodiment, water jet 308 may include a water intake, an impeller within the water jet and an output jet nozzle 310. Water may be sucked in through the water intake and propelled at a high velocity out of the output jet nozzle 310 by the impeller in order to propel pontoon boat 206.

Water jet 308 may be powered by a fuel engine, a battery pack or other type of power supplies. Also, similar to motor 302 and propeller 304 as described above, water jet 308 and/or water jet nozzle 310 may controllably pivot from side to side in order direct the outward force provided by water jet 308 in different directions such that pontoon boat 304 may be steered or otherwise guided. More than one water jet 308 may be utilized and rudders 210 may also be employed as described above.

According to Newton's Third Law of Motion, for every action, there is an equal and opposite reaction. Accordingly, the emission of water stream 102 out of water nozzle 104 may exert a force on water delivery device 100 in the direction opposite to water steam 102. This force may also be described as recoil. Because water delivery device 100 may be configured with pontoon boat 206, this force may in turn be exerted upon pontoon boat 204 which may cause pontoon boat 204 to move in the direction of the recoil force. The recoil force associated with emitting water stream 102 may be significant. For example, where water stream 102 is a water shot produced by the sudden release of compressed air, significant recoil forces may be created.

Because boat 200 or other water delivery device 100 of the current invention is not fixed to a track or other device on the reservoir floor 14, it is preferred that water delivery device 100 include a mechanism to counteract this recoil force.

In one embodiment, vehicle assembly 200 may include keels or reaction plates that may generally extend from the bottom of the vehicle 200 down into the water. Note that the friction component of water against an object moving through the water is proportional to the square of the velocity of the object. Given this, with the vehicle assembly 200 moving through the water the viscous drag between the reaction plates and the water may dampen the sudden jerk or recoil force caused by the emission of water stream 102. Note that the reaction plates may be oriented along the X and/or Y axis or in any orientation that may allow the reaction plates to provide the viscous drag.

Figure 3:
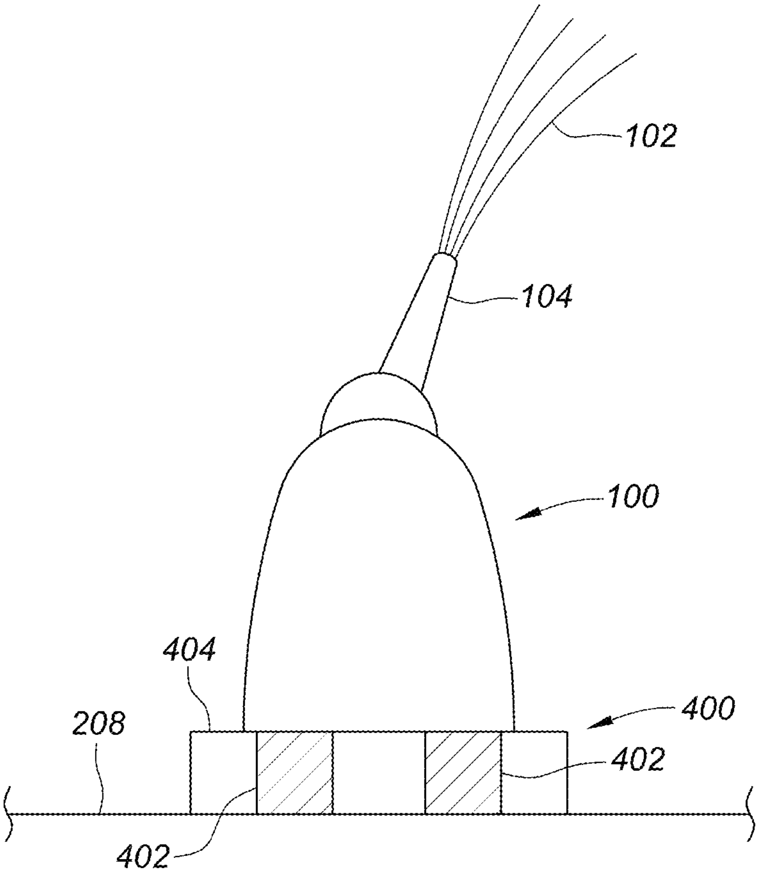
FIG. 3 is a side view of a water delivery device configured with a support assembly including shock absorbers.

In another embodiment, water delivery device 100 may include support assembly 400 that may be configured to reduce or counteract the amount of recoil or force applied to pontoon boat 206 due to the emitting of water stream 102. As depicted in FIG. 3, support assembly 400 may include shock absorbers 402 that may comprise one or more springs, pneumatic pistons, hydraulic pistons, rubber mounts or any other type of materials or mechanisms that may dampen the recoil force exerted by water delivery device 100 to pontoon boat 206 via support assembly 400.

As water stream 102 is emitted out of nozzle 104 thereby creating a force in the direction opposite to water stream 102, the force may be applied to shock absorber 402 which may compress or otherwise absorb the force. As such, the force may be lessened or dampened in order to minimize the movement of pontoon boat 204 due to the exerted force. This preferably helps control the positioning and direction of water stream 102 which may be important in maintaining the desired overall choreography of the water display.

In one example, shock absorber 402 may dampen forces that may result from water steam 102 being emitted in pulses. In this example, each pulse of water stream 102 may result in a pulsed recoil force in the direction opposite to water stream 102 and then to shock absorber 402. Upon receiving the pulsed recoil force, shock absorber 402 may compress to dampen the pulsed force, and may then decompress or generally return to its normal state after the pulse of force subsides. In this way, shock absorber 402 may then be ready to absorb the next pulsed force created by the next pulse of water stream 102.

Accordingly, by dampening each pulse of recoil force caused by the emission of water stream 102, support assembly 400 may lessen the amount of movement of pontoon boat 204 caused by the pulses. This in turn may help maintain the desired position and direction of water stream 102 in the overall choreography of the display.

While FIG. 3 shows water delivery device 100 generally configured with the top surface 404 of support assembly 400, water delivery device 100 may be configured with other surfaces or in other types of configurations with support assembly 400. In addition, while FIG. 3 depicts two shock absorbers 402, support assembly 400 may include any number of shock absorbers 402. Other types of water streams 102 in addition to pulses may also be dampened by shock absorbers 402 and support assembly 400.

In another embodiment, support assembly 400 may include a counterbalance or a balanced recoil system 410 to dampen the recoil forces created by the emitting of water stream 102. In this type of system, a mass may be directed in the opposite direction of the water steam 102 in order to direct energy away from the water stream 102, and by doing so, may generally counteract or tend to cancel at least a portion of the recoil force caused by the water stream 102.

Figure 4:
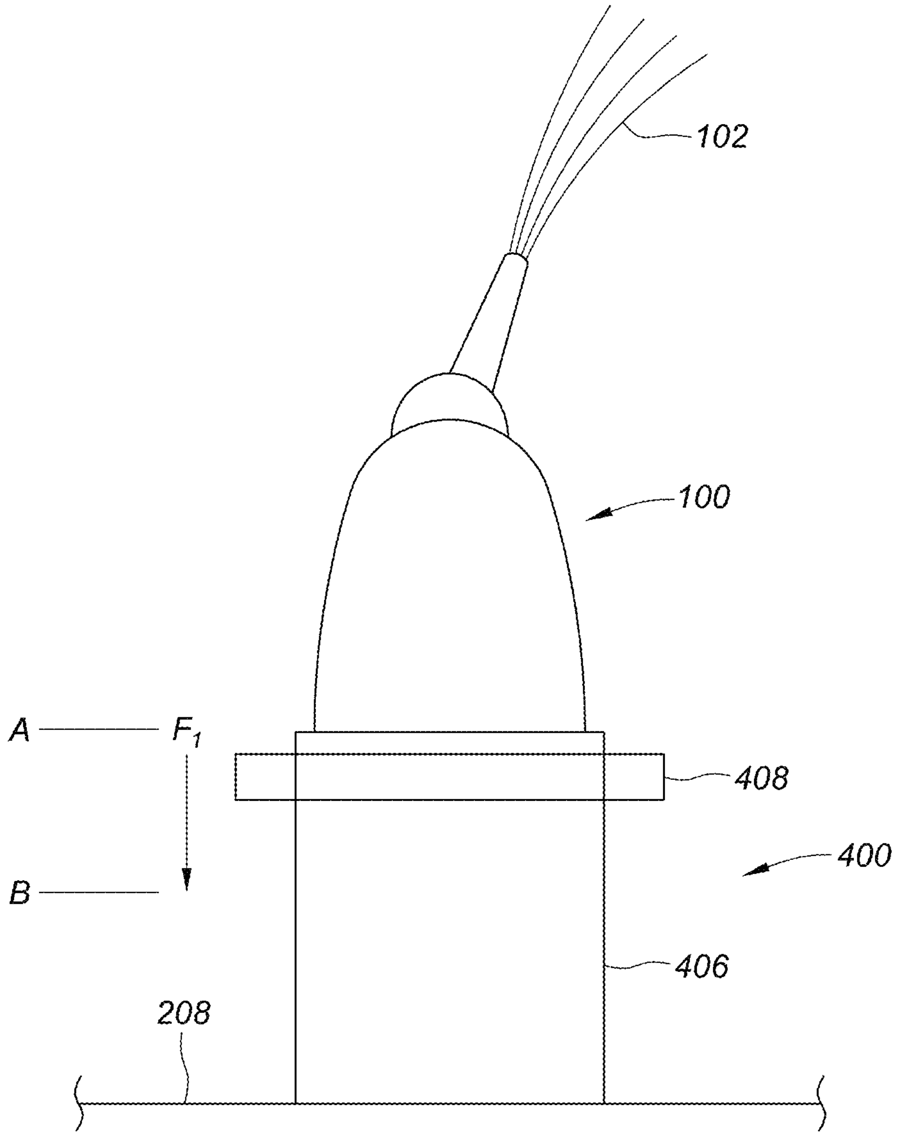
FIG. 4 is a side view of a water delivery device configured with a support assembly including a moving mass.

In one embodiment of this type as depicted in FIG. 4, support assembly 400 may include column 406 and mass 408 that may travel up and down along column 406. Mass 408 may be configured to generally direct energy away from water stream 102 by traveling from position A to position B along column 406 in the direction of arrow F1 as water stream 102 is emitted out of nozzle 104. In the example of a pulsed water steam 102, mass 408 may be positioned at position A upon the beginning of the water pulse 102. As water pulse 102 is emitted, mass 408 may be moved to position B thereby exerting a force generally opposite in direction and magnitude to the recoil force created by the emitted water pulse 102.

Accordingly, the force caused by the movement of mass 408 may generally counteract or cancel at least a portion of the recoil force, and may thereby lessen the amount of movement of pontoon boat 204 caused by emitting water stream 102. When water stream 102 subsides, mass 408 may then be reset and returned to position A in preparation of counteracting another recoil force. Other types of water streams 102 in addition to pulses may also be dampened by the movement of mass 408 and support assembly 400.

While mass 408 is depicted as a ring in FIG. 4, mass 408 may be other types of structures such as rods, balls or other types of forms or structures that may move to generally exert a force in the direction opposite to water stream 102 and its associated recoil force. Support assembly 400 may also include more than one mass 408 and the masses 408 may be the same or of different types. Also, support assembly 400 may include more than one or more columns 406, and the one or more columns 406 may be upright or positioned at different angles. In addition, other types of structures other than column 406 may be used to support mass 408, including tracks, guides, rails, towers or other types of structures, and the structures may be upright or at different angles.

It should also be noted that support assembly 400 may include levers, gears, springs, tracks, guides and other mechanisms and components to position mass 408 at position A, to move mass 408 to position B with enough velocity to create the required counterbalancing force, and to reset mass 408 back to position A as required. In addition, mass 408 may be configured with support assembly 400 in any manner required in order to perform its functionality.

Mass 408 may be configured or incorporated directly with water delivery device 100 and water delivery device 100 may have all the components and mechanisms necessary to utilize mass 408 as described above. Mass 408 may also be configured or incorporated directly with vehicle assembly 200 and vehicle assembly 200 may have all the components and mechanisms necessary to utilize mass 408 as described above. In general, mass 408 and the other components and mechanisms necessary for its utility as described above may be configured or incorporated in any manner with water delivery device 100 and its associated assemblies.

Support assembly 400 may include shock absorbers 402 and balanced recoil system 410, individually or in combination, to dampen the effect of forces created by the emitting of water stream 102. In addition, support assembly 400 may include other mechanisms and may employ other techniques to dampen the forces created by the emission of water stream 102.

Figure 4A:
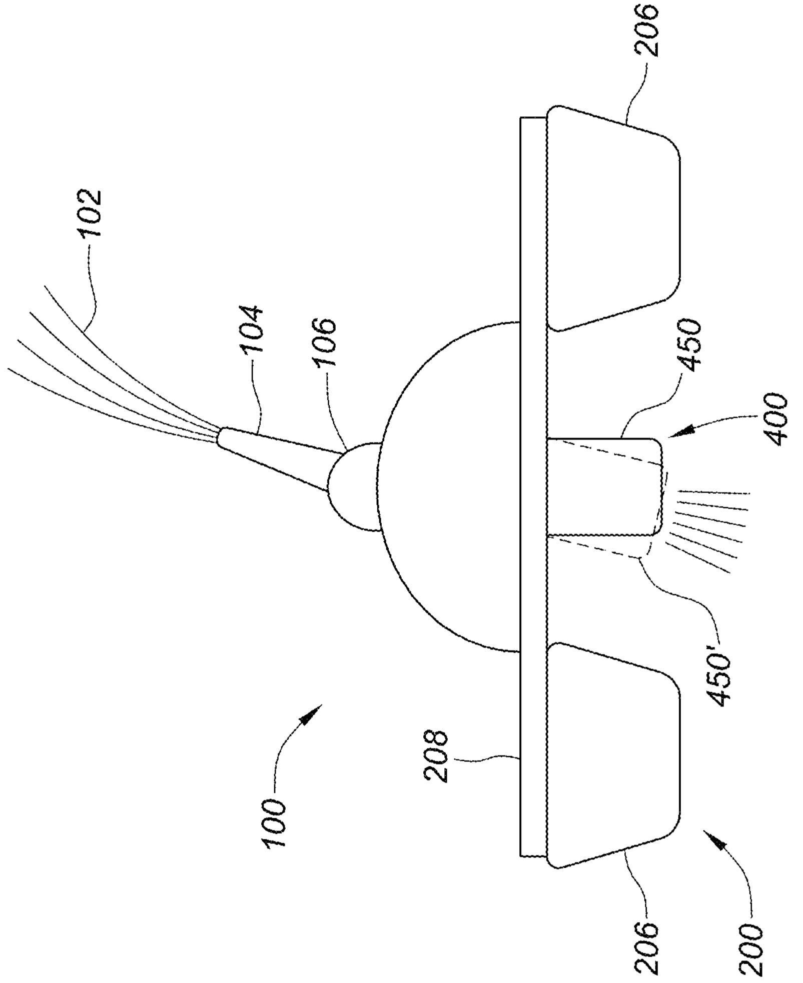
FIGS. 4A-4E depict a series of side views of the water delivery device configured with a support assembly that includes a bazooka-like mechanism.

Another such counterbalance system 400 may include a bazooka-type mechanism 450 as shown in FIG. 4A. It should be noted that the term "bazooka" as used herein is not meant as limiting counterbalance system 400 to a gun or weapon-type mechanism that may be commonly associated with "bazooka." Instead, the term "bazooka" is intended to broadly cover other mechanisms that may deliver a burst of recoil force.

In this embodiment, bazooka 450 may itself emit a burst 102A of water or air as a means to counteract the recoil force created by water stream 102. Bazooka 450 may be positioned on the underside of water delivery device 100 so that burst 102A is emitted into the water of reservoir 12.

Bazooka 450 may be configured so that its position may vary as shown in FIG. 4A. For example, bazooka 450 may generally reside at a default or home position as shown by the solid line in FIG. 4A. However, to counterbalance water stream 102, which is being emitted at an angle, bazooka 450 may be moved so that its axial direction is as shown by dashed line 450'. As such, the recoil force from water stream 102 and the counteracting force from bazooka burst 102A preferably cancel each other out, so that water delivery device 100 remains stable, and so that the position and direction of water stream 102 is as desired.

Figure 4B:
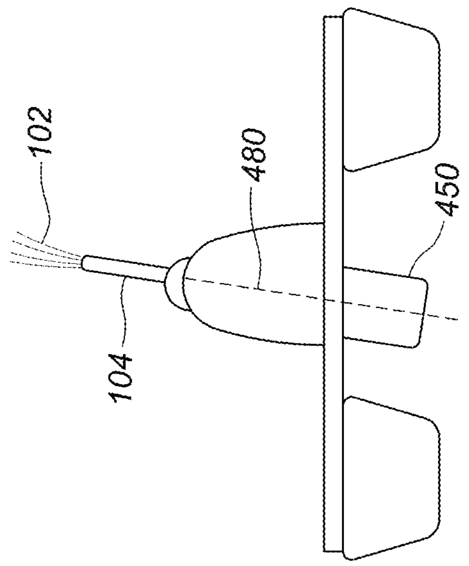
Figure 4C:
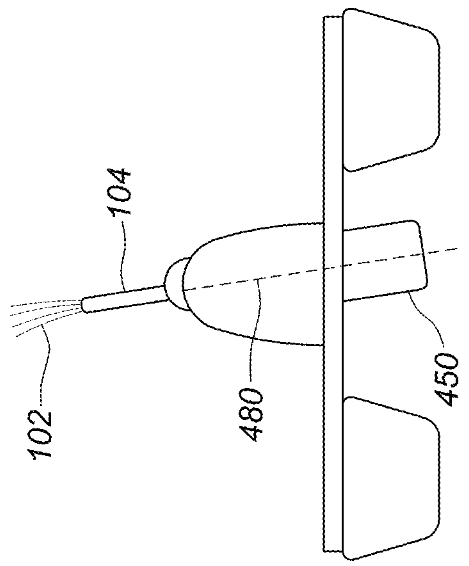

It is preferred that the recoil force associated with water stream 102 and the force associated with bazooka burst 102A generally fall along the same line or axis as shown by the different dashed lines 480 in FIGS. 4B and 4C. With nozzle 104 and bazooka 450 aligned in this manner, a rotational force on water delivery device 100 may be reduced and/or avoided. This in turn maintains the desired position and direction of water stream 102 in the overall choreography of the display.

Figure 4D:
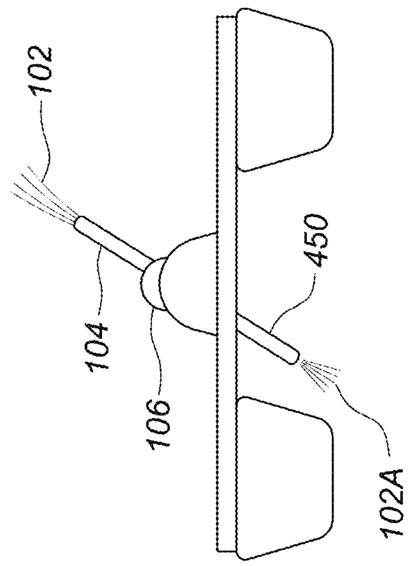
Figure 4E:
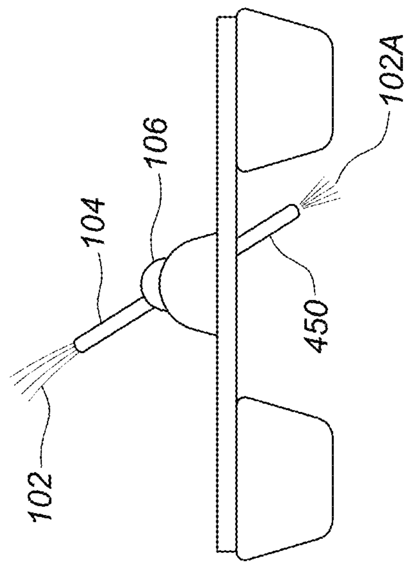

Bazooka mechanism 450 may be mounted to water delivery device 100 by a gimbal (not shown) or other device to provide rotation. Bazooka 450 may also be slidable along the underside of water delivery device 100 as shown in FIGS. 4D and 4E to accommodate situations where nozzle 104 is tilted at larger angles, thereby requiring burst 102A to be emitted further away from the centerline of water delivery device 100. To provide this flexibility, bazooka 450 may slide on tracks mounted to water delivery device, e.g., on the bottom of platform 208.

Bazooka 450 or support assembly 400 may include an intake to receive water to be emitted for burst 102A. Alternatively, device 450 may store compressed air that is released to coincide with water stream 102.

Figure 4F:
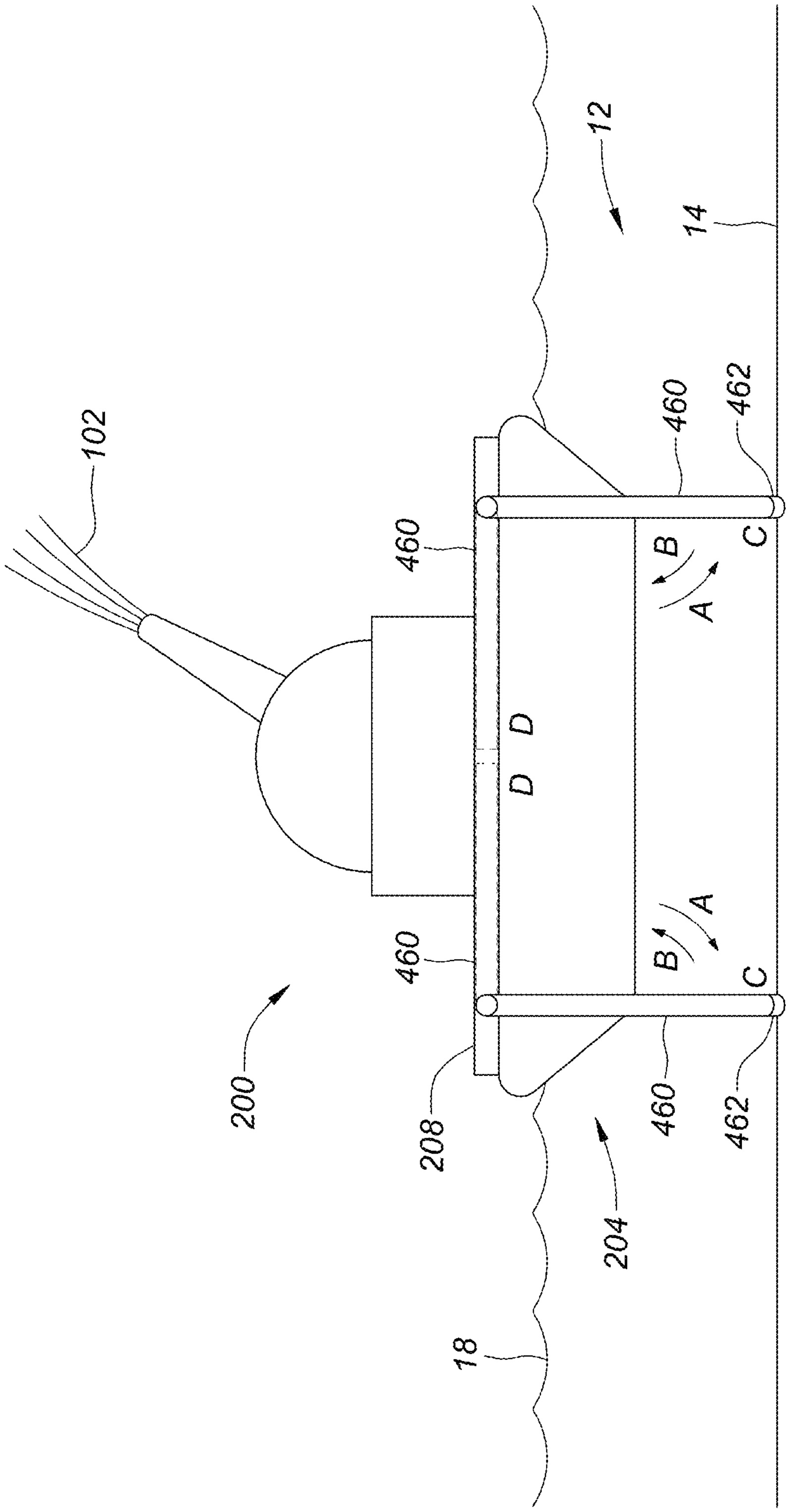
FIG. 4F is a side view of a water delivery device configured with deployable support legs.

In another example as depicted in FIG. 4F, support assembly 400 may include support legs 460 that may extend generally downward from vehicle 200 and that may engage the bottom 14 of reservoir 12 in order to provide support to vehicle 200 while water stream 102 may be emitted. In the example of vehicle 200 being a pontoon boat 204, support legs 460 may be pivotally attached to the pontoon boat 204 such that they may rotate in the direction of arrows A from an upper and non-deployed position (such as position D) downward to a lower and deployed position C as shown. Once deployed, legs 460 may lock in place and may engage in physical contact with the bottom 14 of reservoir 12. In this way, legs 460 may provide vertical and lateral support to pontoon boat 204 when water stream 102 may be emitted such that vehicle 200 may not tilt, rock, bob or otherwise become displaced by the backwards force caused by the emission of water stream 102. And, when the vehicle 200 is ready to move to a new location, support legs 460 may rotate upward in the direction of arrows B to a upper and non-deployed position such as position D. Note that legs 460 in position D are depicted with dashed lines.

Figure 4G:
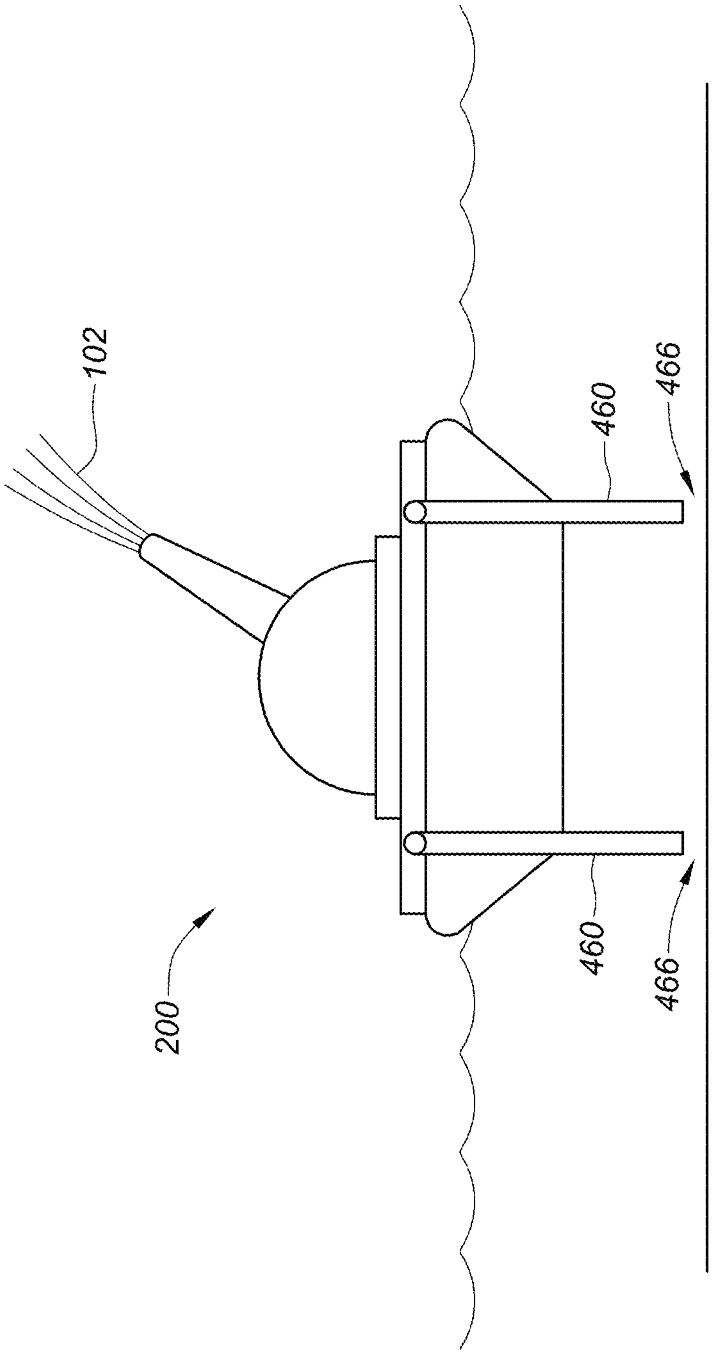
FIG. 4G is a side view of a water delivery device configured with deployable support legs and a gap.

In another example as depicted in FIG. 4G, legs 460 may deploy to a lower position that may result with the bottom of legs 460 being positioned slightly above the bottom 14 of reservoir 12 such that there is a gap 466 between the bottom of legs 460 and the bottom 14 surface. In one example of this type, the bottom of support legs 460 may deploy downward to a position 1 cm-5 cm above the bottom surface 14, however, other sized gaps 466 may also be used. In this way, vehicle 200 may continue to move within reservoir 12 with legs 460 deployed, and because legs 460 may not contact floor 14, they may not obstruct its movement. However, upon shooting water stream 102, the backward force caused by water stream 102 may push the pontoon boat 204 backward and downward such that legs 460 may lower further into the reservoir and make contact with the bottom surface 14. Then, once engaged with the bottom 14, the support legs 460 may provide support to vehicle 200 such that it does not move any further backward or lower into the pool 12. The gap 466 may be chosen to be large enough such that legs 460 don't contact the bottom 14 of the reservoir as the vehicle 200 moves about, but small enough such that when the water stream 102 is emitted, the backward force is enough to push vehicle 200 downward enough for the bottom of the legs 460 to come into contact with the bottom surface 14 to provide further support to vehicle 200. It is also preferred that the amount of movement of vehicle 200 to allow for legs 460 to lower and engage bottom floor 14 may not be enough to alter the intended direction of emitted water stream 102. In addition, this amount of movement may be estimated and accounted for in the pointing, aiming or otherwise general control of water stream 102. Note that this functionality may also be achieved by support legs 460 that deploy completely down to engage with bottom surface 14, and also have the ability to deploy to a position that is slightly retracted above bottom 14 (for example 1 cm-5 cm) such that gap 466 may exist. In this case, it may be preferable that the support legs 460 may be able to lock in this slightly retracted position such that the legs 460 are stable and can provide strong support. In can therefore be seen that in this example, legs 460 may either fully engage bottom 14 when fully deployed or may allow for gap 466 when slightly retracted, and as such, may perform both types of support methodologies as described above.

Figure 4H:
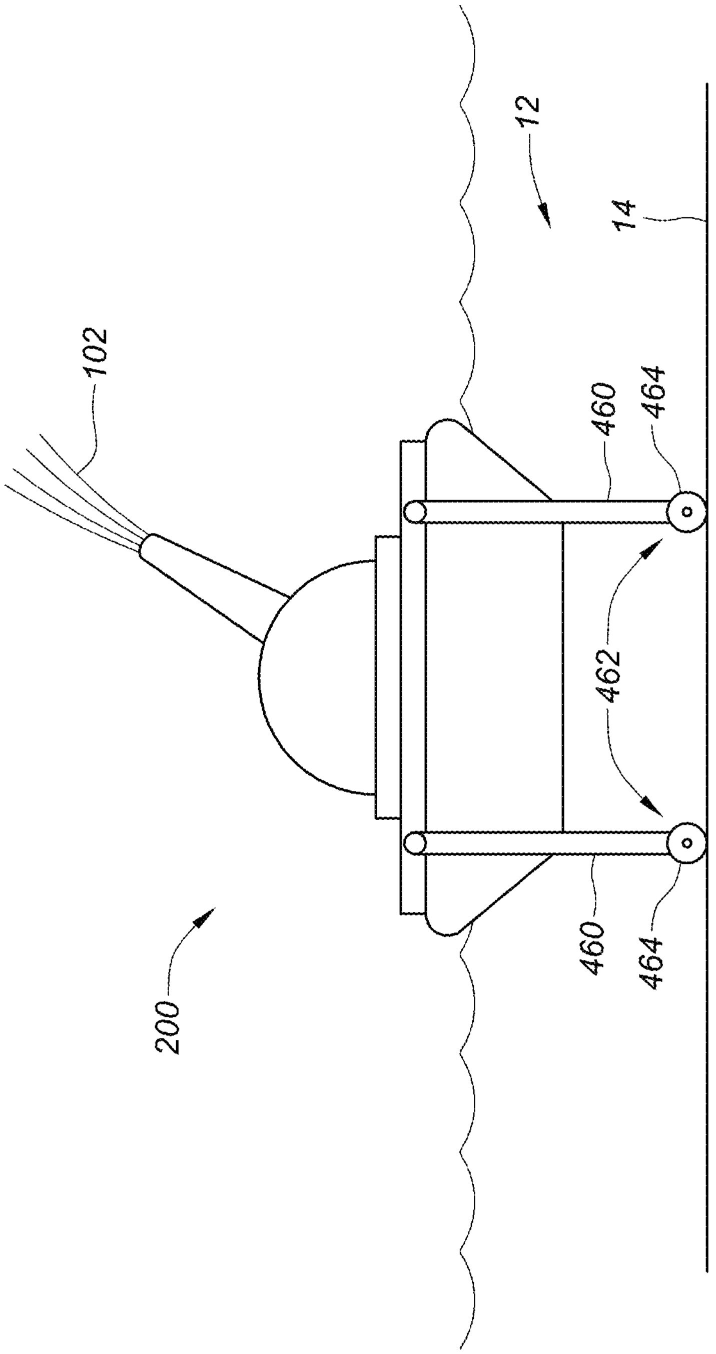
FIG. 4H is a side view of a water delivery device configured with deployable support legs with rollers.

Note that in these examples, support legs 460 may include support feet 462. In one example, support feet 462 may comprise rubber or other types of materials that may provide traction between legs 460 and the bottom surface 14 for better support of vehicle 200. In a different example as shown in FIG. 4H, support feet 462 may include wheels, rollers 464 or other types of mechanisms that may allow support feet to be in contact with and move along the bottom surface 14 of reservoir 12 as the vehicle 200 moves about with the legs 460 deployed. In this way, legs 460 with rollers 464 may engage bottom 14 to provide support but may not add drag to the vehicle 200 as it moves about the reservoir 12 emitting water streams 102. In this example, it may be preferable that the bottom surface 14 be generally smooth and free of large obstructions that may otherwise obstruct the legs 460 with rollers 464. In addition, floor 14 may include tracks, guides, grooves, indentations or other types of structures that feet 462 may engage with (with or without rollers 464) that may provide additional support and guidance to legs 460 and vehicle 200.

Note that while support legs 460 as shown in FIG. 4F are rotatably configured to platform 208 of pontoon boat 204, the legs 460 may be attached to other components of pontoon boat 204 (such as to pontoon 206 or other components) or in any other location that may allow for the adequate deployment of the legs 460. In addition, legs 460 may be configured with other types of vehicles 200 such as single hull boats, multi-hull boats, and other types of boats. In the case of a single hull boat 200, support legs 460 may be configured along each side of the hull of the boat 200.

As shown in FIG. 4F, a total of four legs 460 may be configured with vehicle 200 with a set of two legs 460 on the port side of the boat 200 and a set of two legs 460 on the starboard side of the boat 200 (note that the port-side two legs 460 cannot be seen in side view FIG. 4F). However, it should be noted that other numbers of legs 460 such as one, two, three, five, six and other numbers of legs 460 may be configured with vessel 200, and in any configuration. In addition, while FIGS. 4F and 4G depict legs 460 as generally rectangular and extending generally vertically up and down, legs 460 may comprise other shapes such as triangular, cones, spikes or other shapes, and can be configured in different orientations such as at an outward angle, an inward angle, slanted, curved, at a sideways angle or in any other orientation or shape.

Also, while FIGS. 4F and 4G depict each leg 460 rotating downward as a single unit, legs 460 may have joints along their lengths that allow them to fold up more compactly for storage such that upon deployment each joint may open so that legs 460 may unfold. In another example, legs 460 may be telescopic such that they deploy and retract telescopically. That is, legs 460 may comprise concentric tubular sections along their lengths that may slide within one another for each leg 460 to retract, and then slide out of one another for each leg 460 to deploy. In addition, in another example, a single leg 460 may deploy with a wide profile foot 462 (for example, one meter wide) in the shape of a circle, square, oval, octagon, rectangle or other shape that may extend outward beyond the diameter of the leg 460 such that this extension may lend additional lateral support to vehicle 200 when engaged with bottom surface 14. Legs 460 may also be hybrids of these different types of legs or may comprise of any other type of device that may be deployed into a position that may provide support to vehicle 200 as described above. Also, legs 460 may include electric motors or other types of devices that may facilitate the deployment and retraction of legs 460.

Figure 4I:
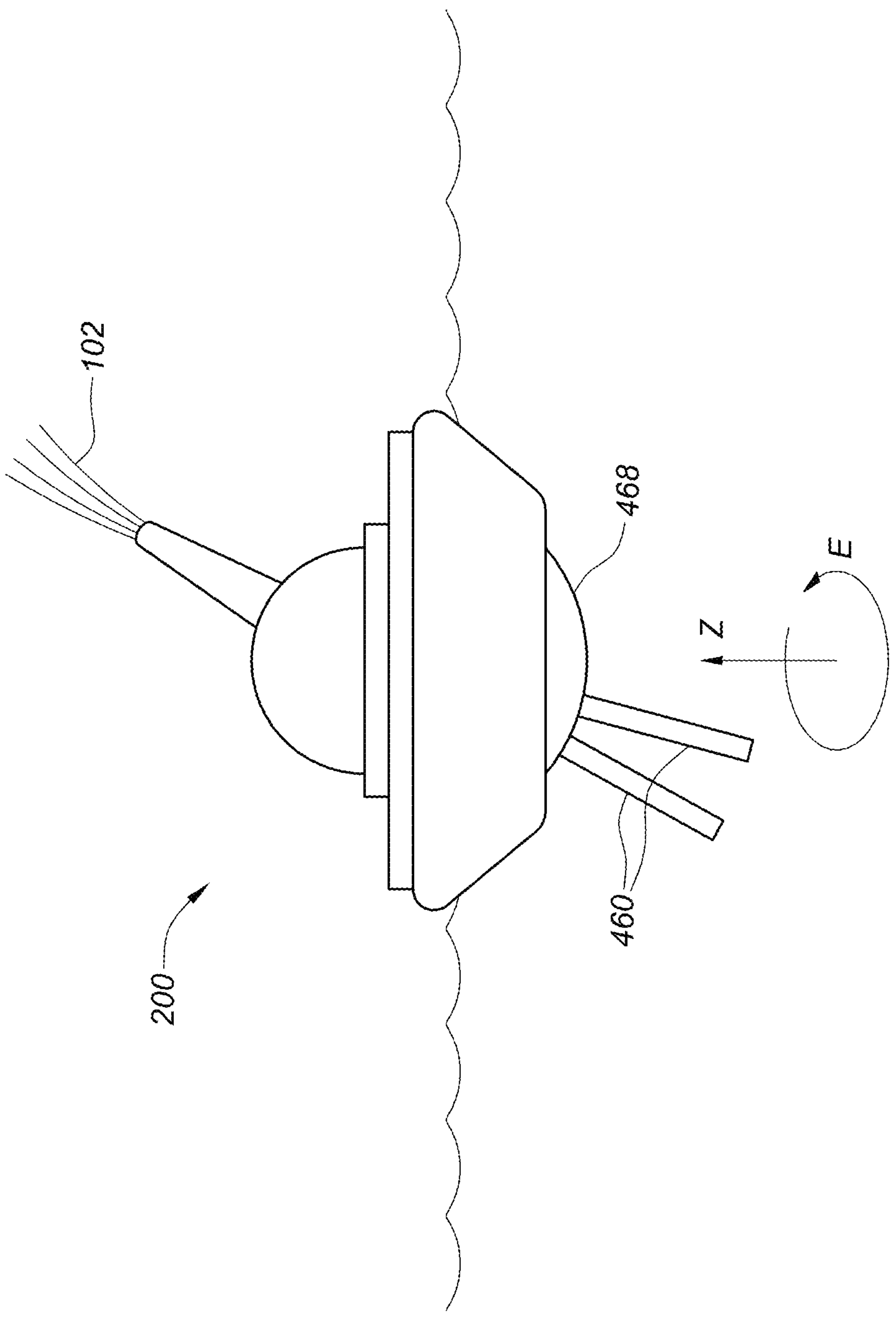
FIG. 4I is a side view of a water delivery device configured with deployable support legs configured with a moveable mount.

In another example, support legs 460 may be configured with moveable mount 468 as shown in FIG. 4I. In this example, moveable mount 468 may be configured generally underneath boat 200 and may rotate about the vertical axis Z in the direction of arrow E such that support legs 460 may be positioned or otherwise oriented in any rotational position below moveable mount 468 and vehicle 200. In this way, moveable mount 468 may rotate to position legs 460 directly behind and opposite the direction of emitted water steam 102 such that as the vehicle 200 may rock or tilt backwards due to the exerted force from the emission of water steam 102, legs 460 may be positioned to engage the bottom surface 14 of reservoir 12 to provide support to vehicle 200. It may be preferable that legs 460 extend outward as well as downward such that as the vehicle starts to tilt, the legs 460 may be positioned properly to engage with the bottom surface 14 at an angle and orientation that is generally opposite the emitted water stream 102.

In addition, support legs 460 in this example may deploy such that they directly engage bottom surface 14 upon deployment, may deploy such that gap 466 exists, or may have the ability to do either or both. Also, all of the details described above for other types of legs 460 also pertain to legs 460 configured with moveable mount 468. Note that while FIG. 4I depicts two support legs 460 configured with moveable mount 468, any number of legs 460 may be used.

It should be noted that in all of the examples above, the legs 460 may retract upward to be stored within a compartment within vehicle 200 and/or moveable mount 468, may be retracted and stored on the side of vehicle 200 and/or moveable mount 468, or in a combination of inside and outside vehicle 200 and/or moveable mount 468. In addition, it may be preferable that the legs 460 in all of the examples above be streamlined so as to reduce the water drag or sheer force on legs 460 as the vehicle 200 moves through the water. It should also be noted that the deployment, retraction, positioning and other aspects of the support arms 460 and/or moveable mount 468 may be controlled by controller unit 220 as described in the section below.

Figure 4J:
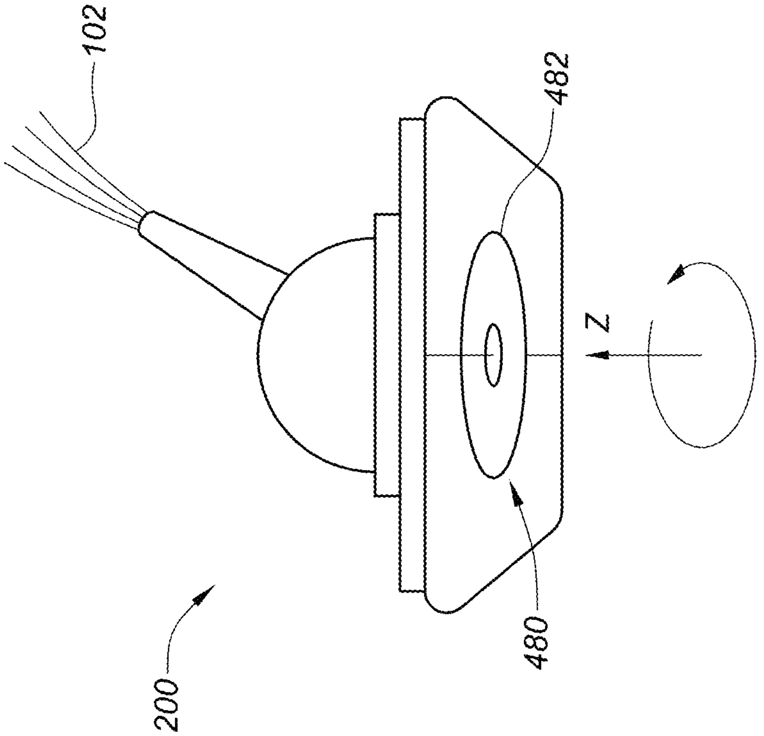
FIG. 4J is a side view of a water delivery device configured with a gyroscope.

Another such counterbalance system 400 may include a gyroscope mechanism 480 configured with vehicle 200 as shown in FIG. 4J. As known in the art, a gyroscope is a mechanism comprising a wheel or disk 482 mounted so that it may spin rapidly about an axis (such as around the Z axis shown in FIG. 4J). According to the theory of conservation of angular momentum, the spinning wheel 482 will resist forces that are directed at tilting the axis upon which it spins and may therefore be used to provide stability to vehicle 200. As depicted, spinning wheel 482 may be configured horizontally with vehicle 200 and may be positioned within the hull of boat 200 in the case of a single hull boat, in-between the pontoons of pontoon boat 202, and in any other location or position with any other type of vehicle. It may be preferred that gyroscope mechanism 480 be securely configured with boat 200 such that as the gyroscope 480 opposes forces directed at tilting the Z-axis upon which it spins, boat 200 may also resist the same forces. In this regard, the stability imposed by gyroscope 480 may counteract the forces imposed upon vehicle 200 by the emission of water stream 102. It should be noted that gyroscope 480 will not however oppose movement in the horizontal direction and will therefore not interfere with the movement of vehicle 200 about reservoir 12. In one example, wheel 482 of gyroscope 480 may comprise a cast iron wheel with a diameter of approximately one meter and a thickness of 1 cm-5 cm, but other sized wheels 482 comprising of different materials may be used.

In addition, it should be noted that gyroscope 480 may include an electric motor that may facilitate the spinning of wheel 482. In addition, once spinning, the gyroscope 480 may store mechanical energy such that spinning wheel 482 may be configured to drive small generators that may in turn power other elements on vehicle 200 such as lights or other elements. In addition, the spinning wheel 482 may serve to charge batteries that may be used to power elements on vehicle 200.

Figure 5:
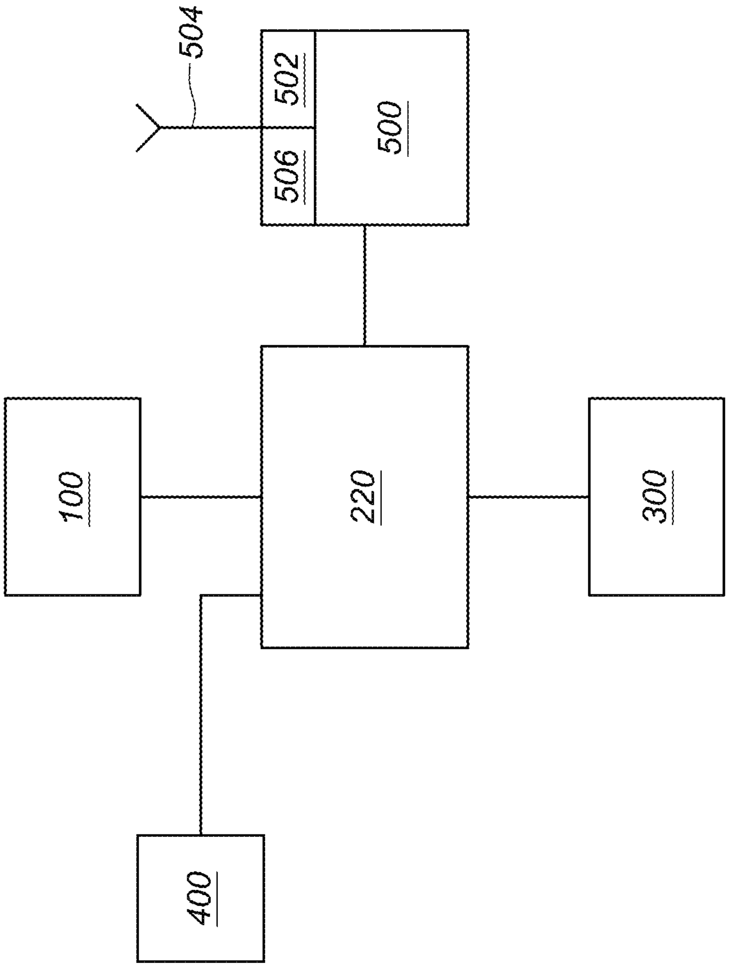
FIG. 5 is a block diagram of a controller unit, a water delivery device, a propulsion assembly, a support assembly and a guidance assembly.
Figure 6A:
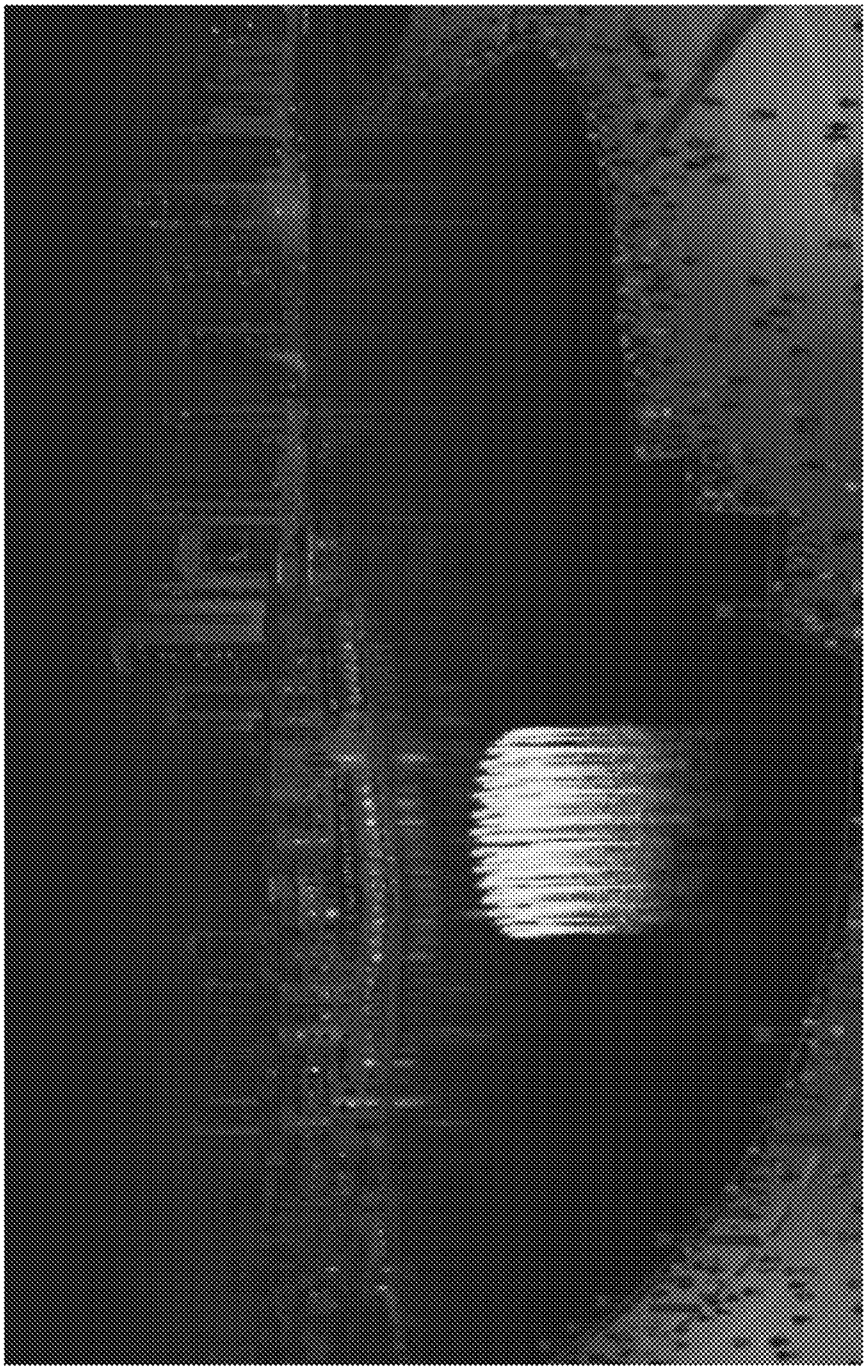
FIGS. 6A-6F is a sequence of views showing the movement and operation of multiple mobile water delivery devices in connection with a water display.
Figure 6B:
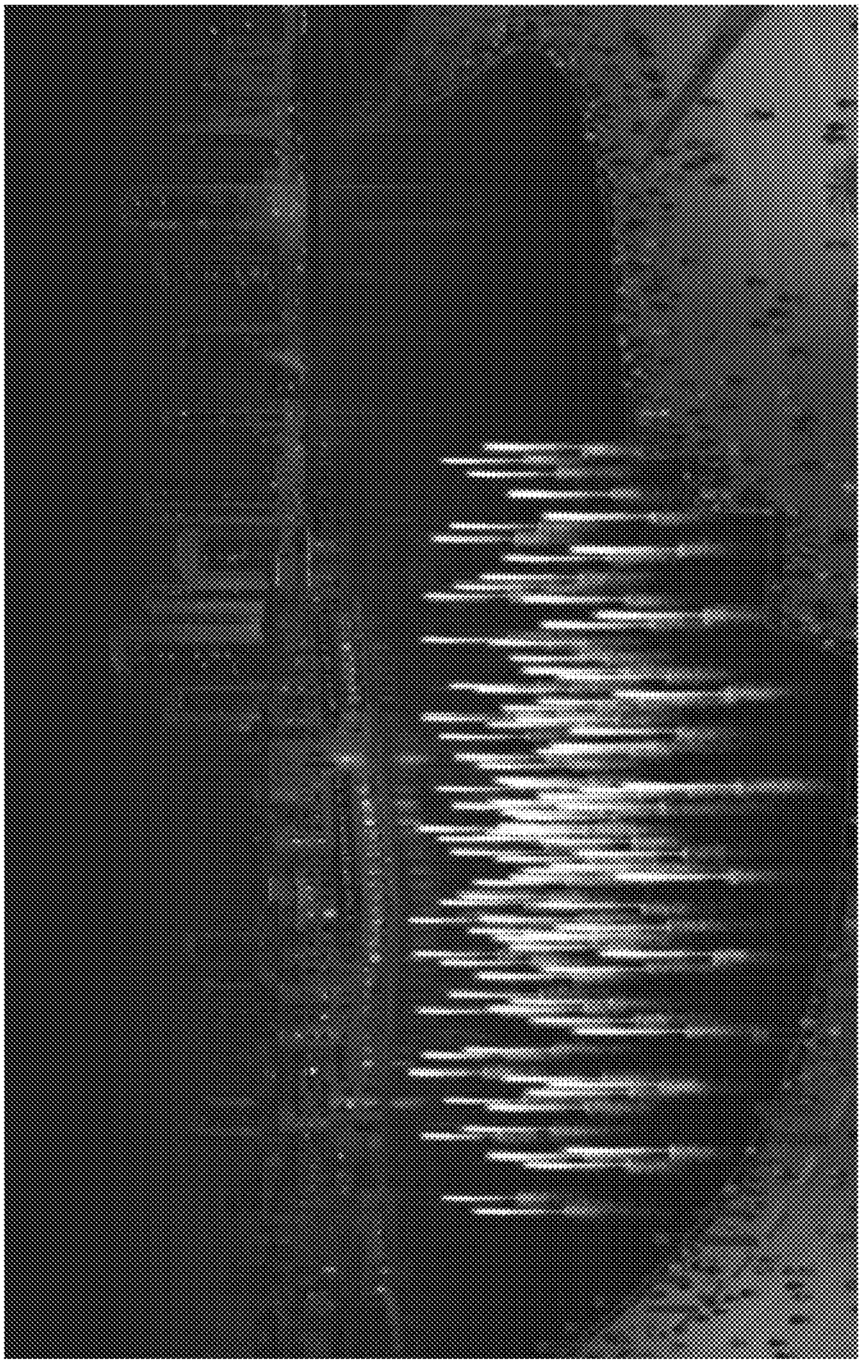
Figure 6C:
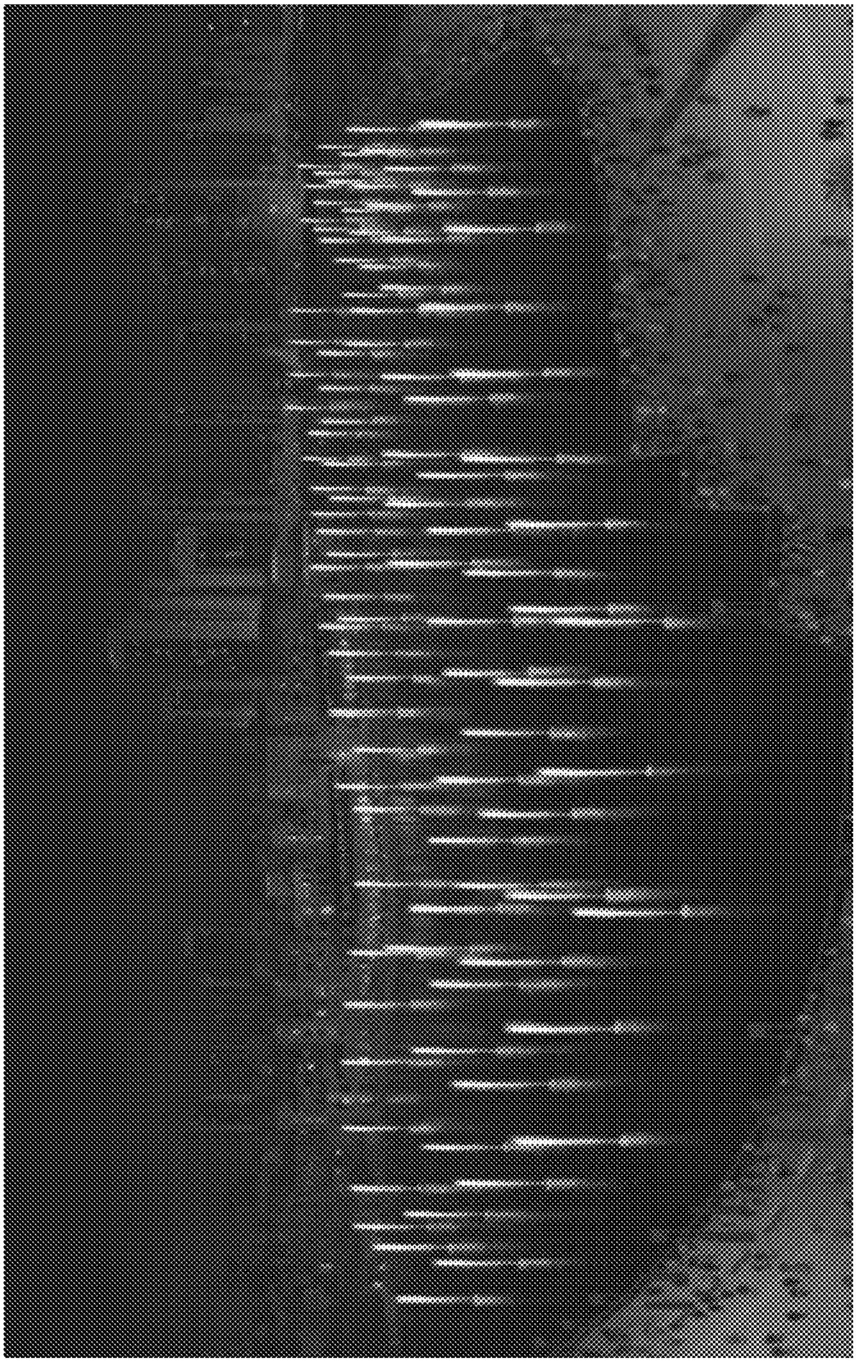
Figure 6D:
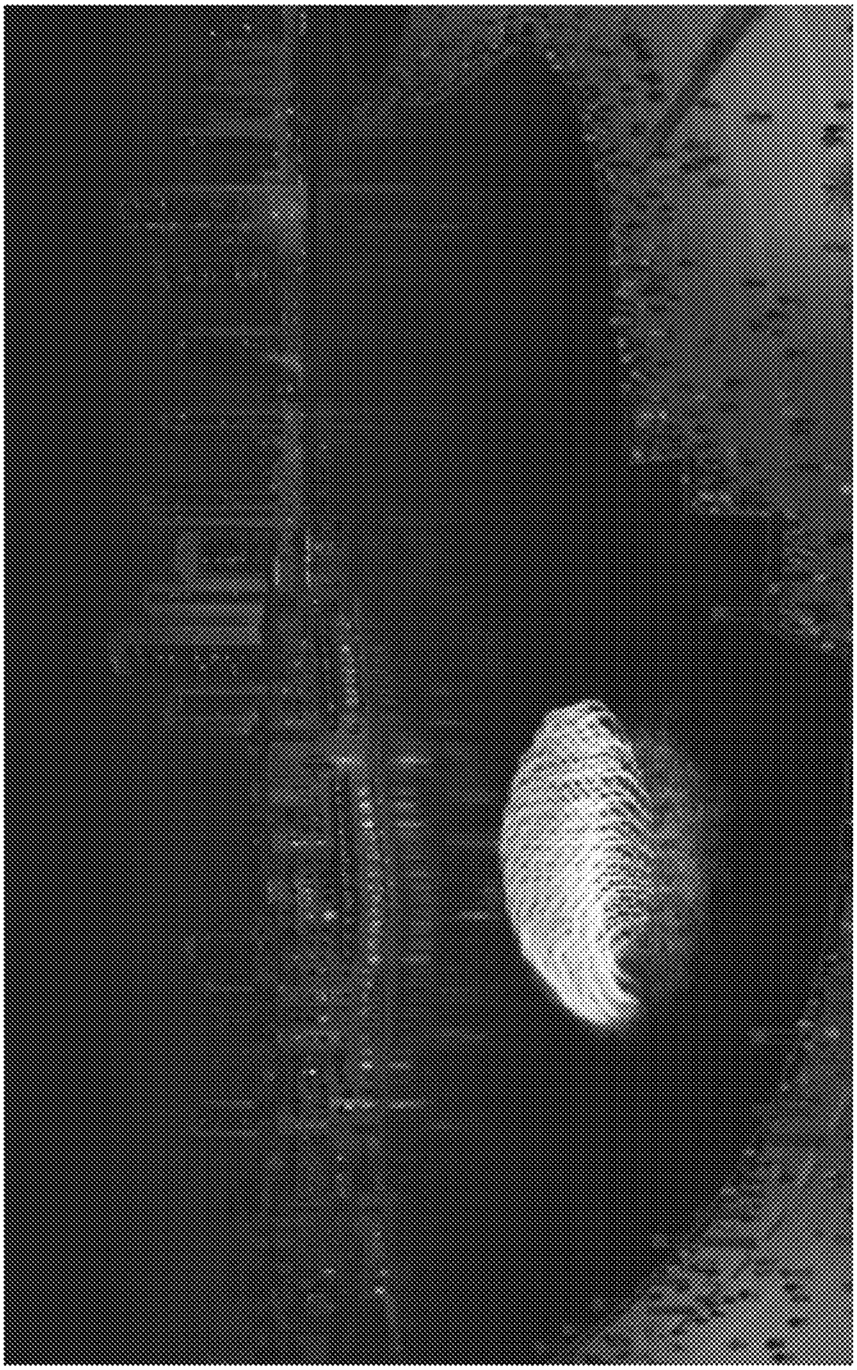
Figure 6E:
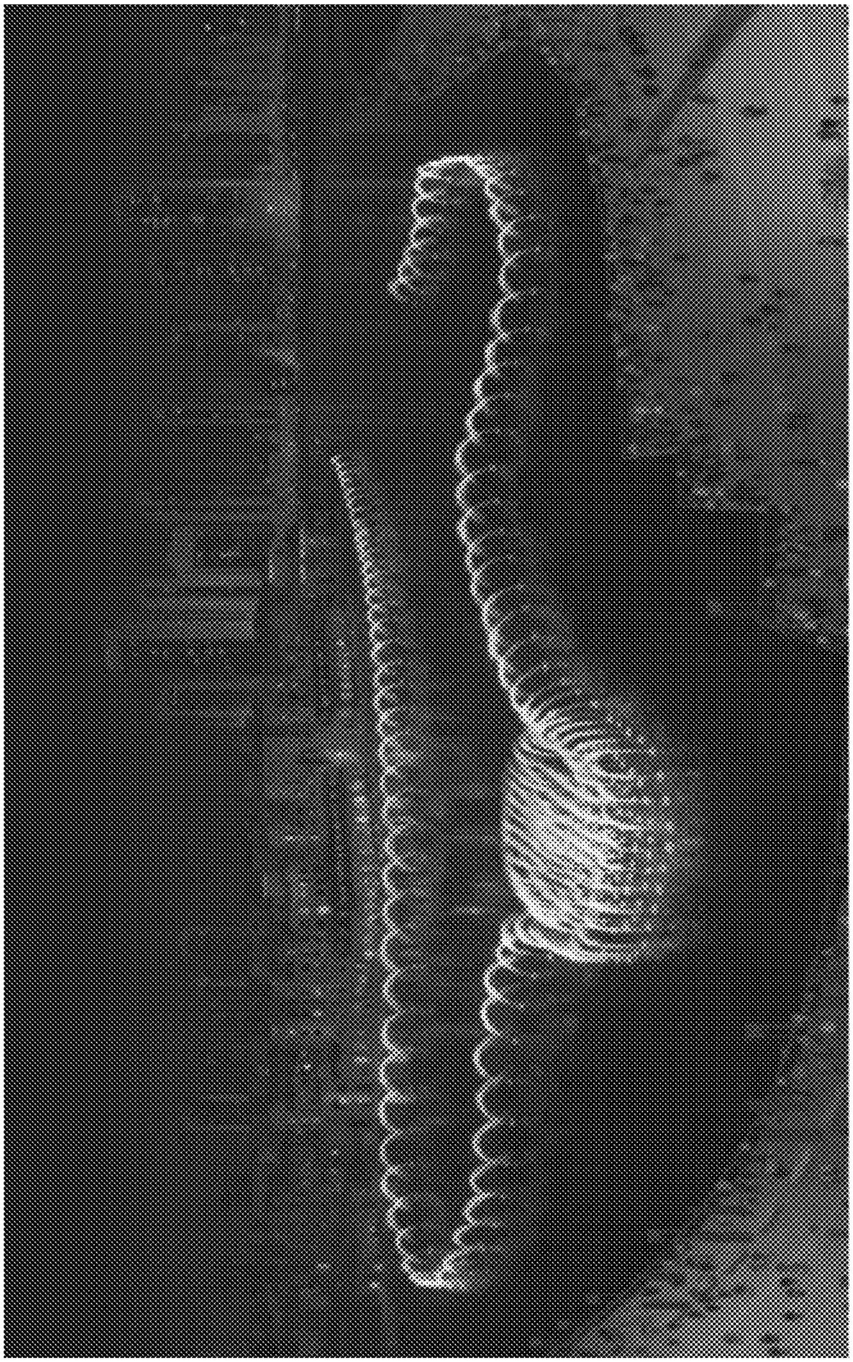
Figure 6F:
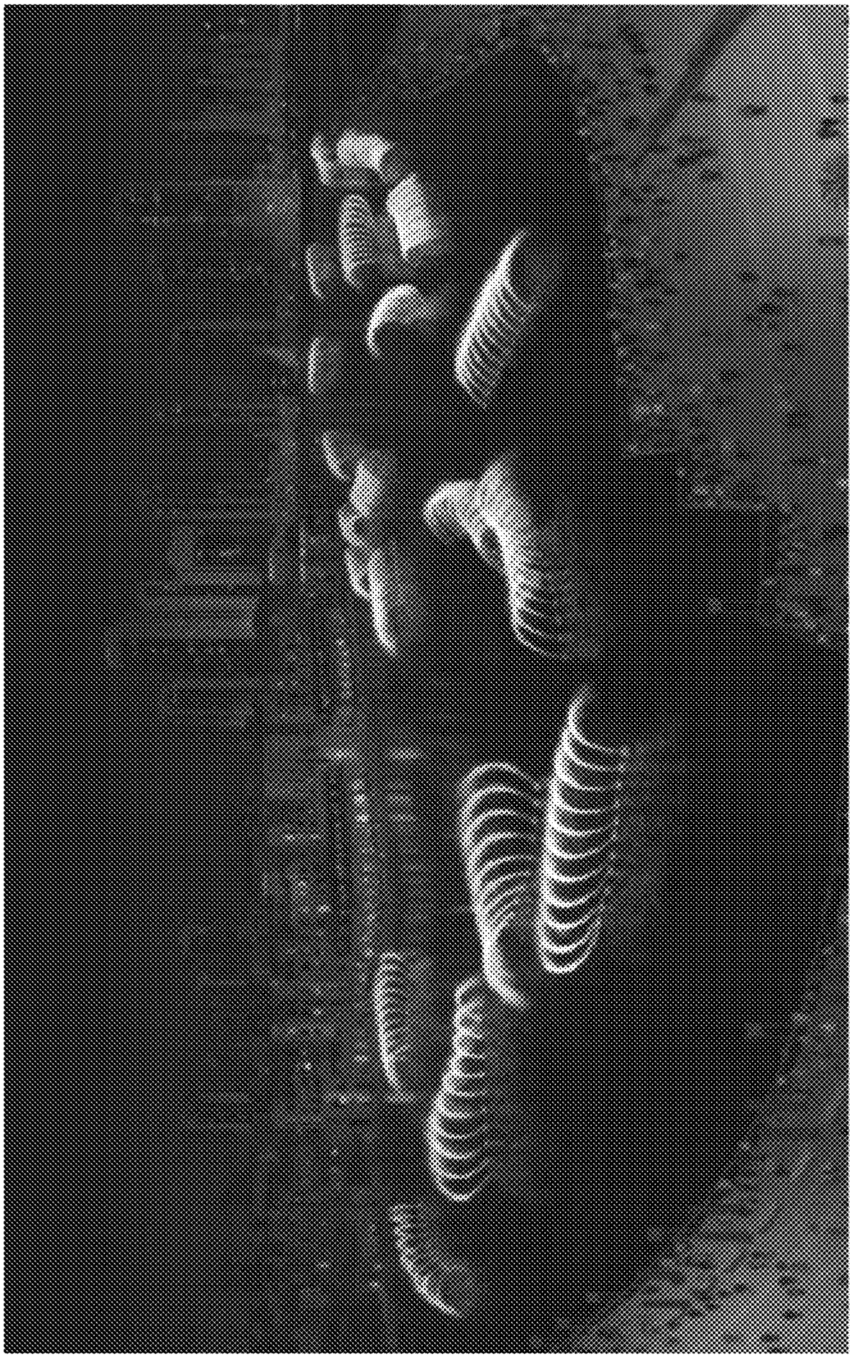
Figure 7A:
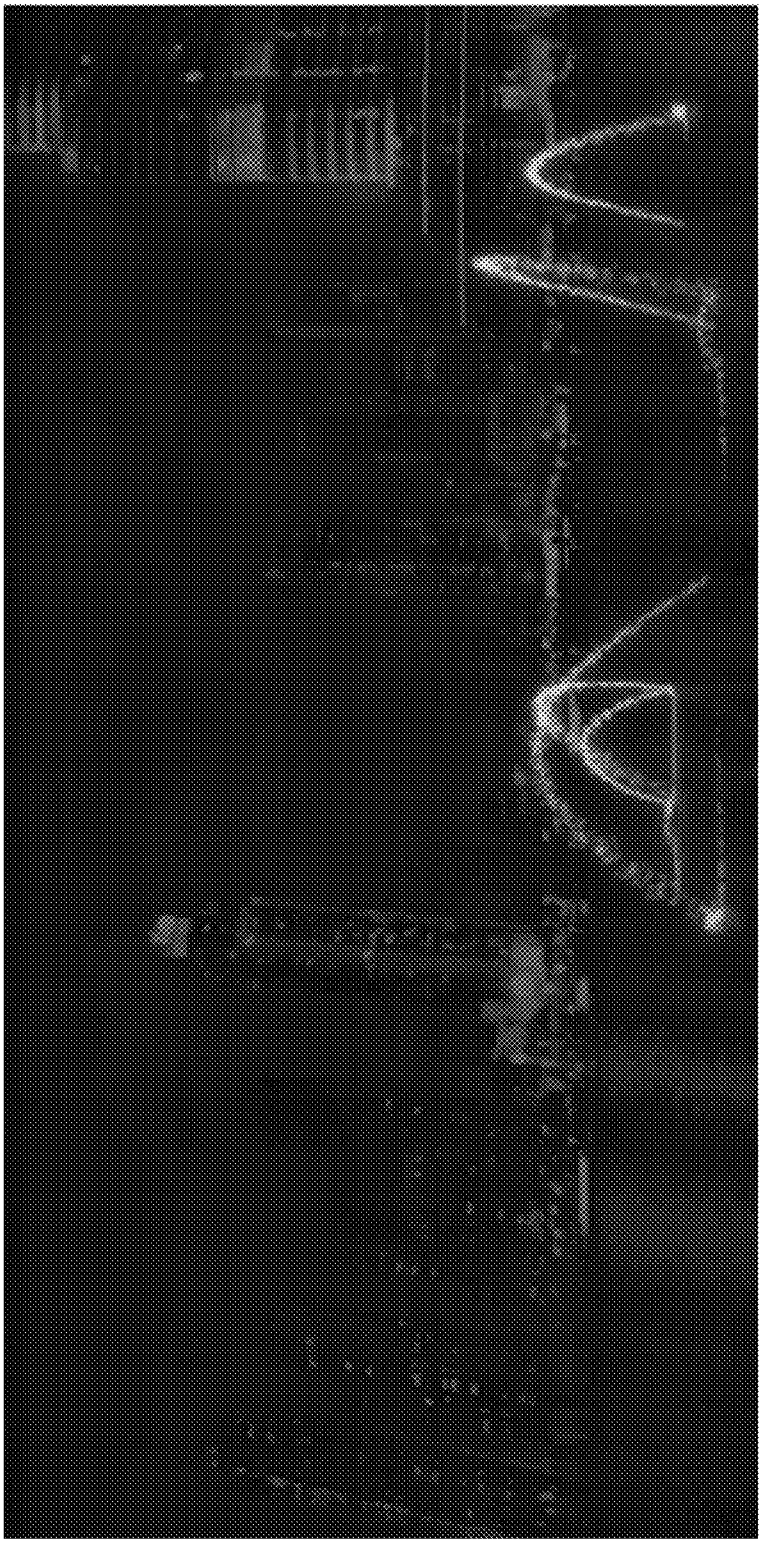
FIGS. 7A-7L is a sequence of views showing the movement and operation of multiple mobile water delivery devices in connection with a water display.
Figure 7B:
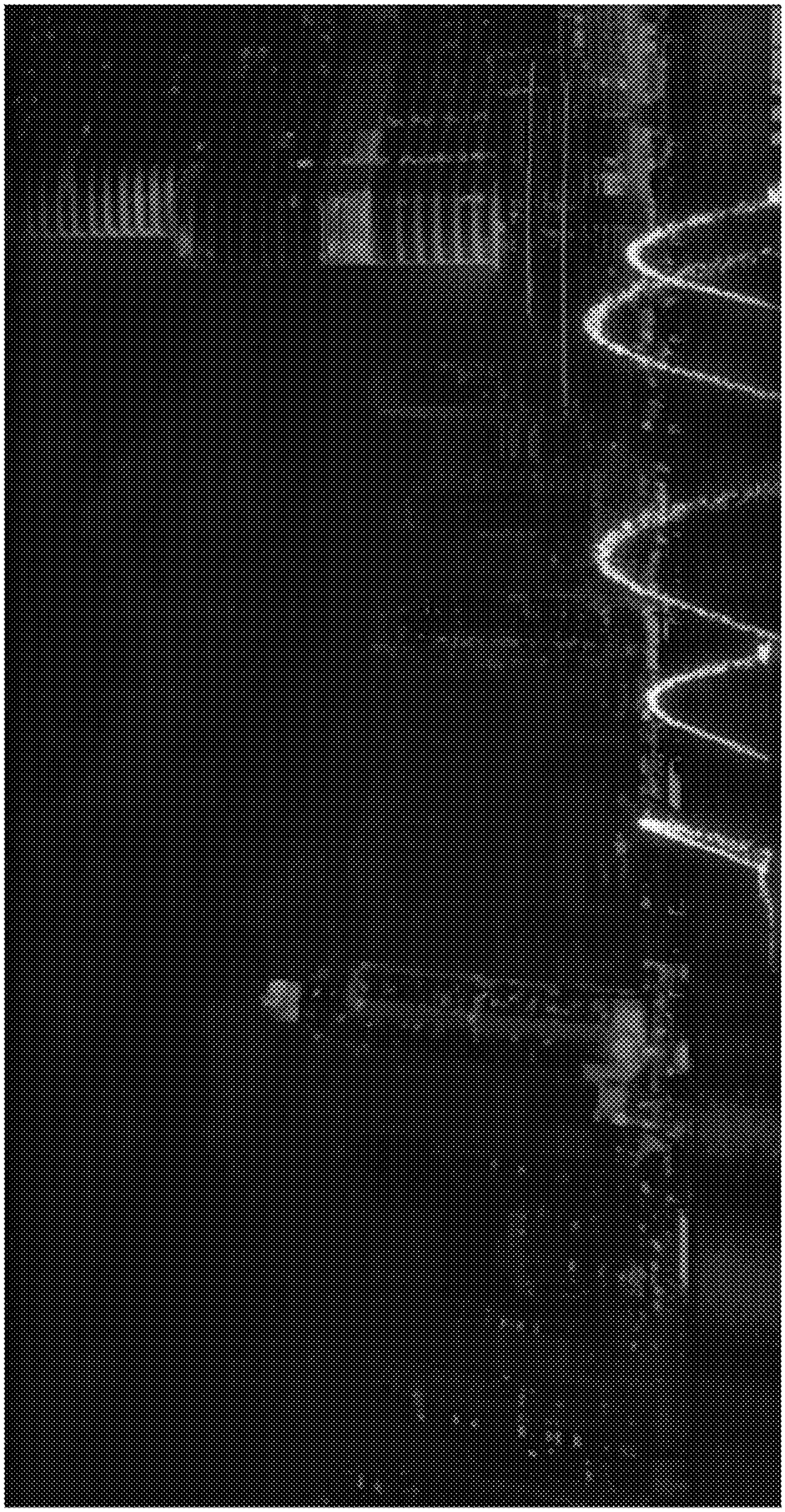
Figure 7C:
Figure 7D:
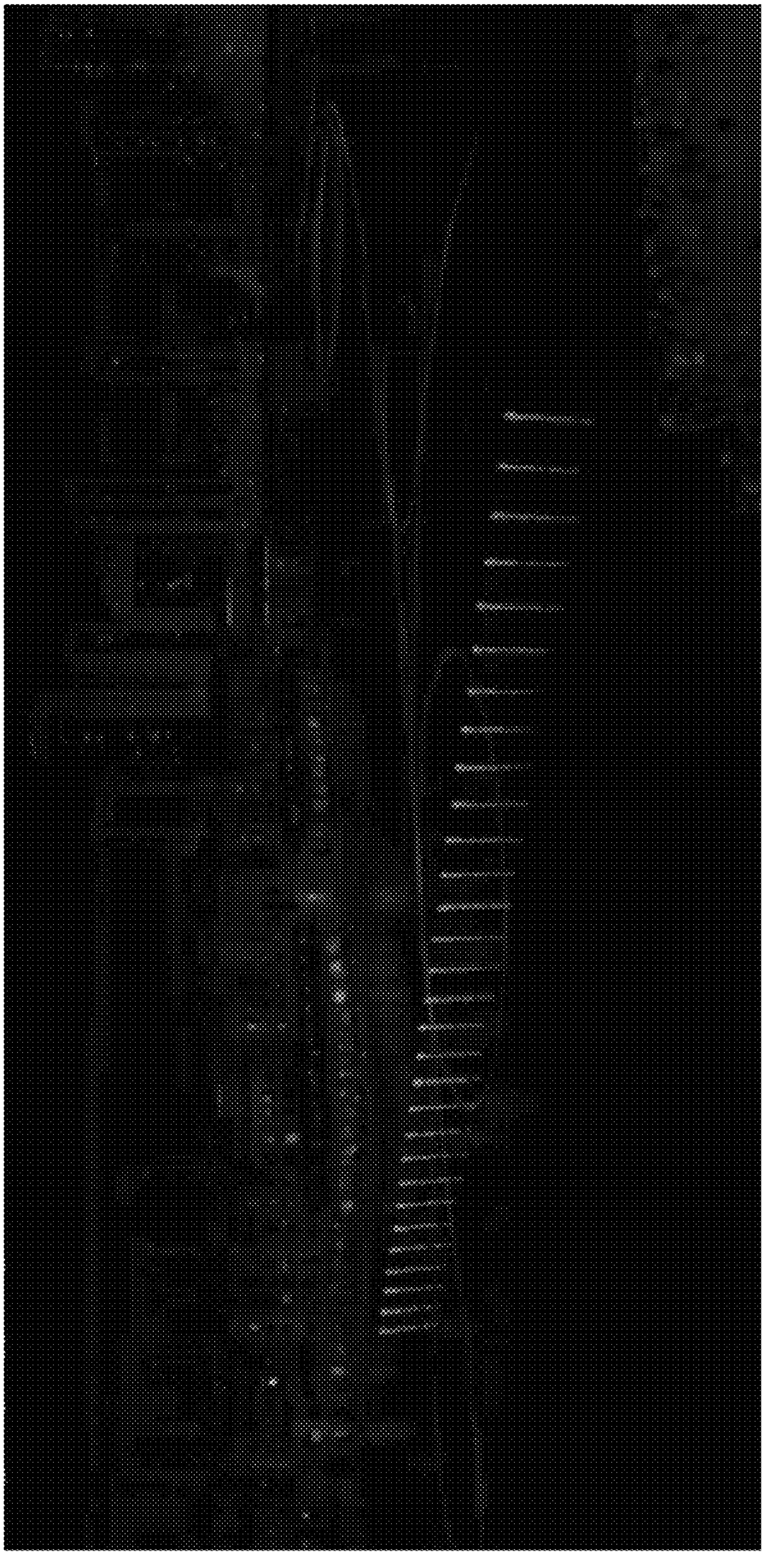
Figure 7E:
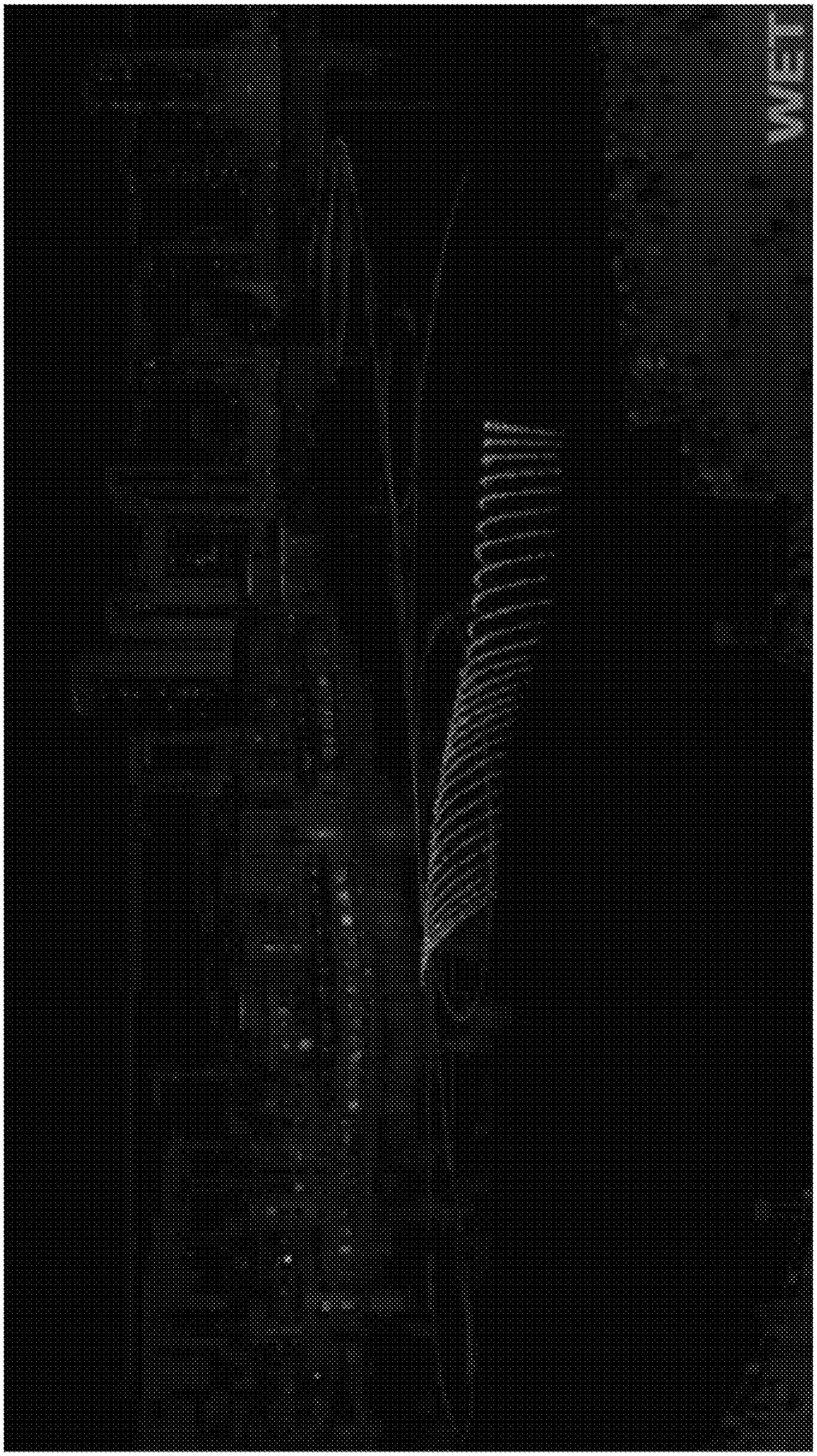
Figure 7F:
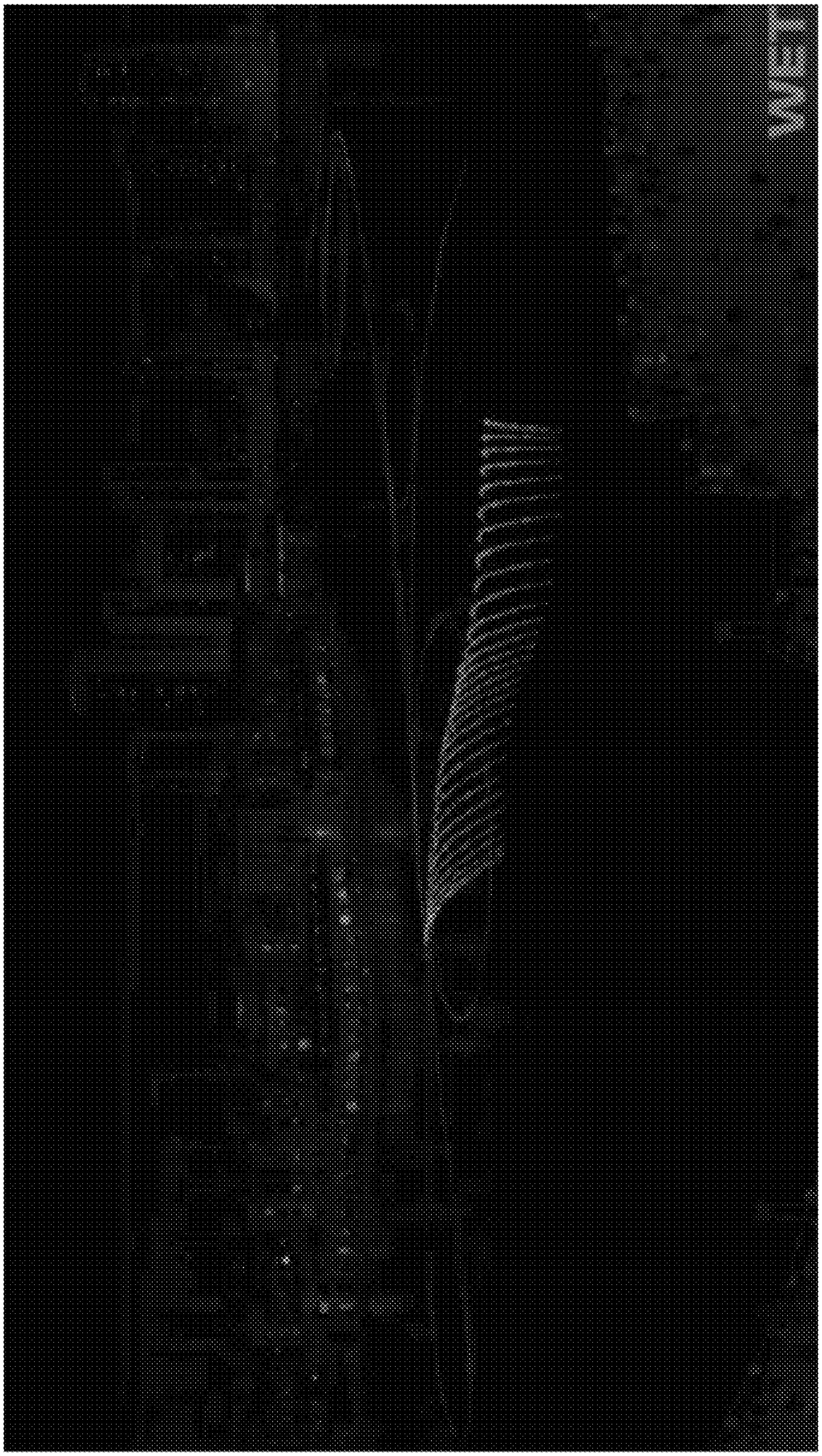
Figure 7G:
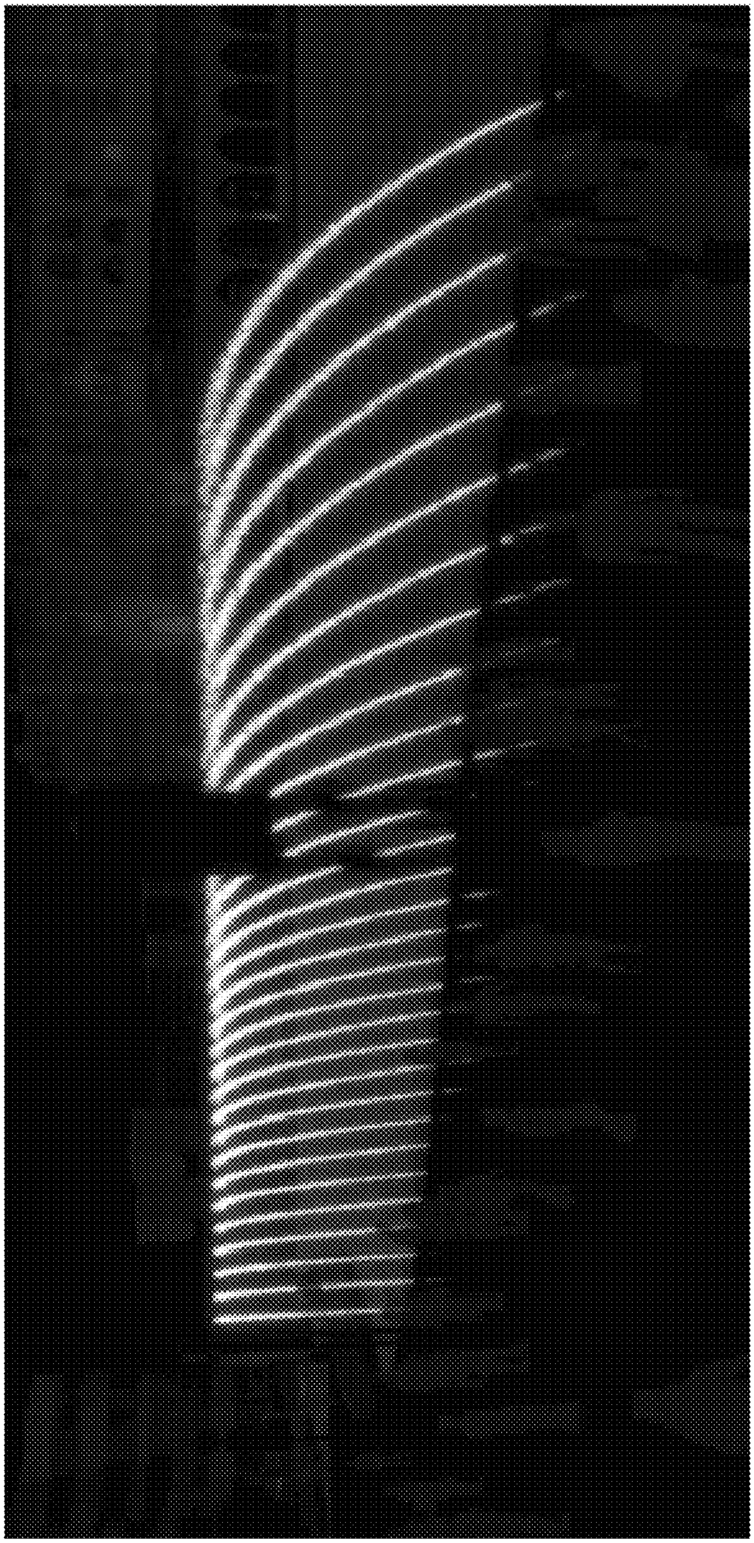
Figure 7H:
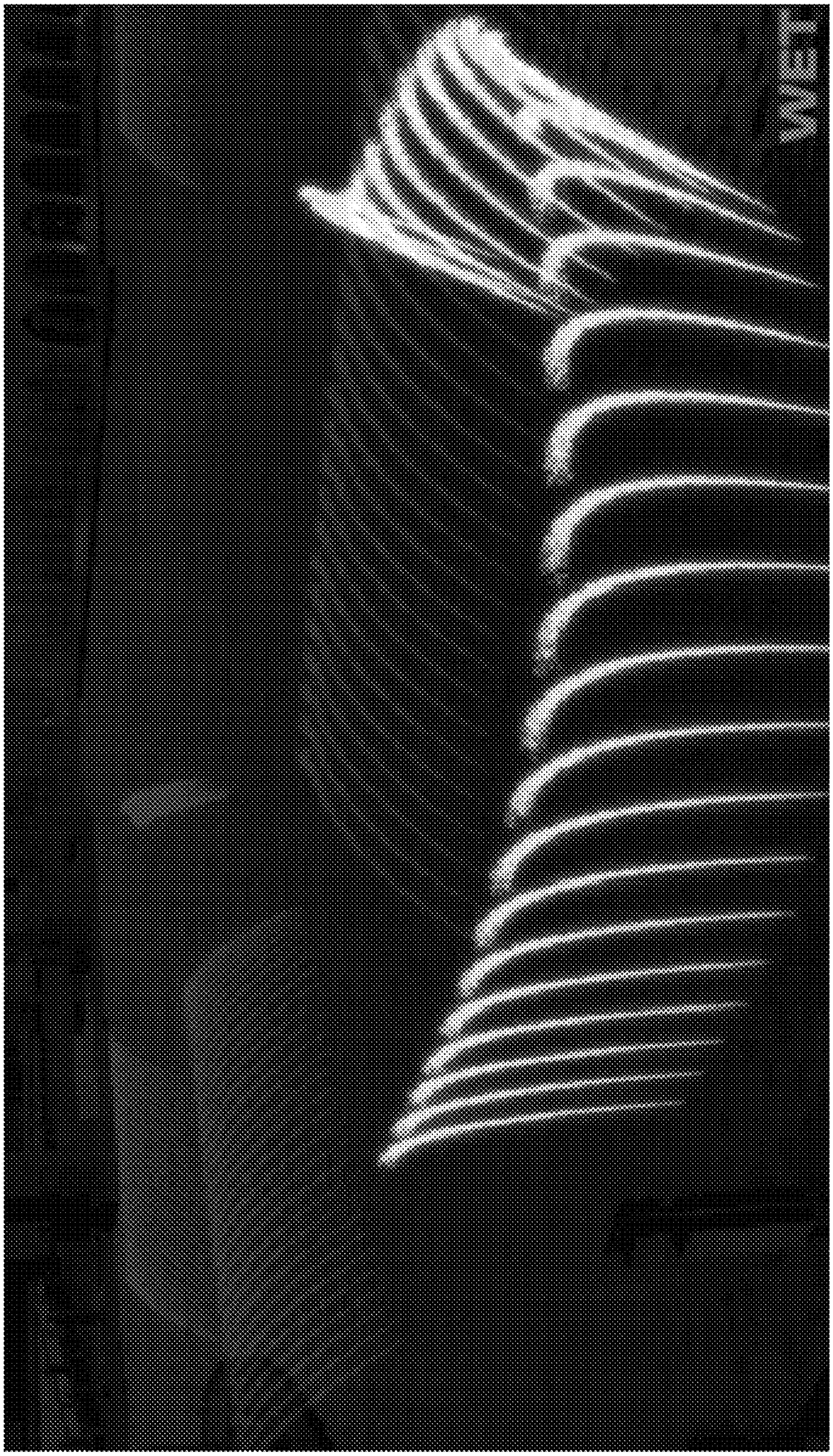
Figure 7I:
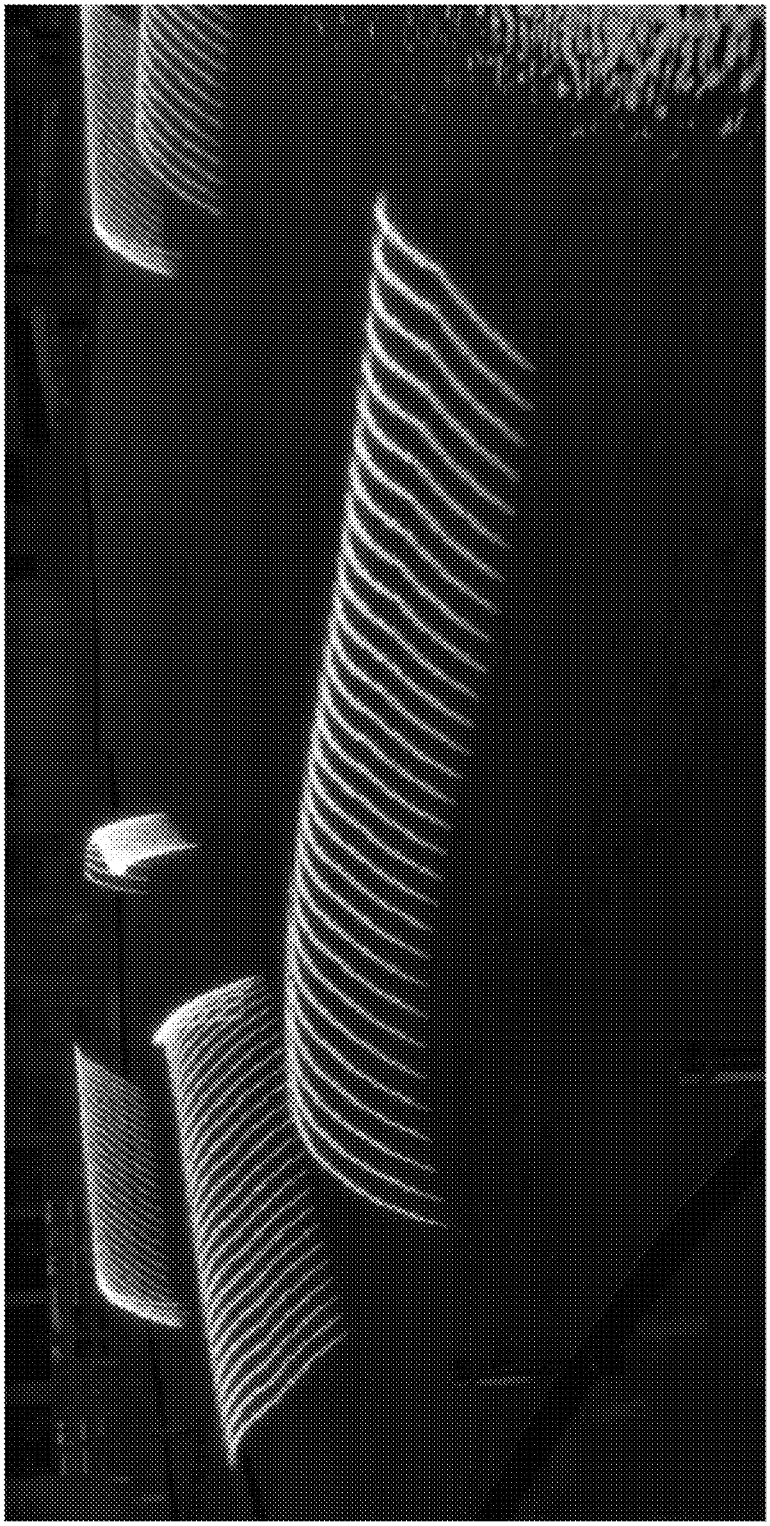
Figure 7J:
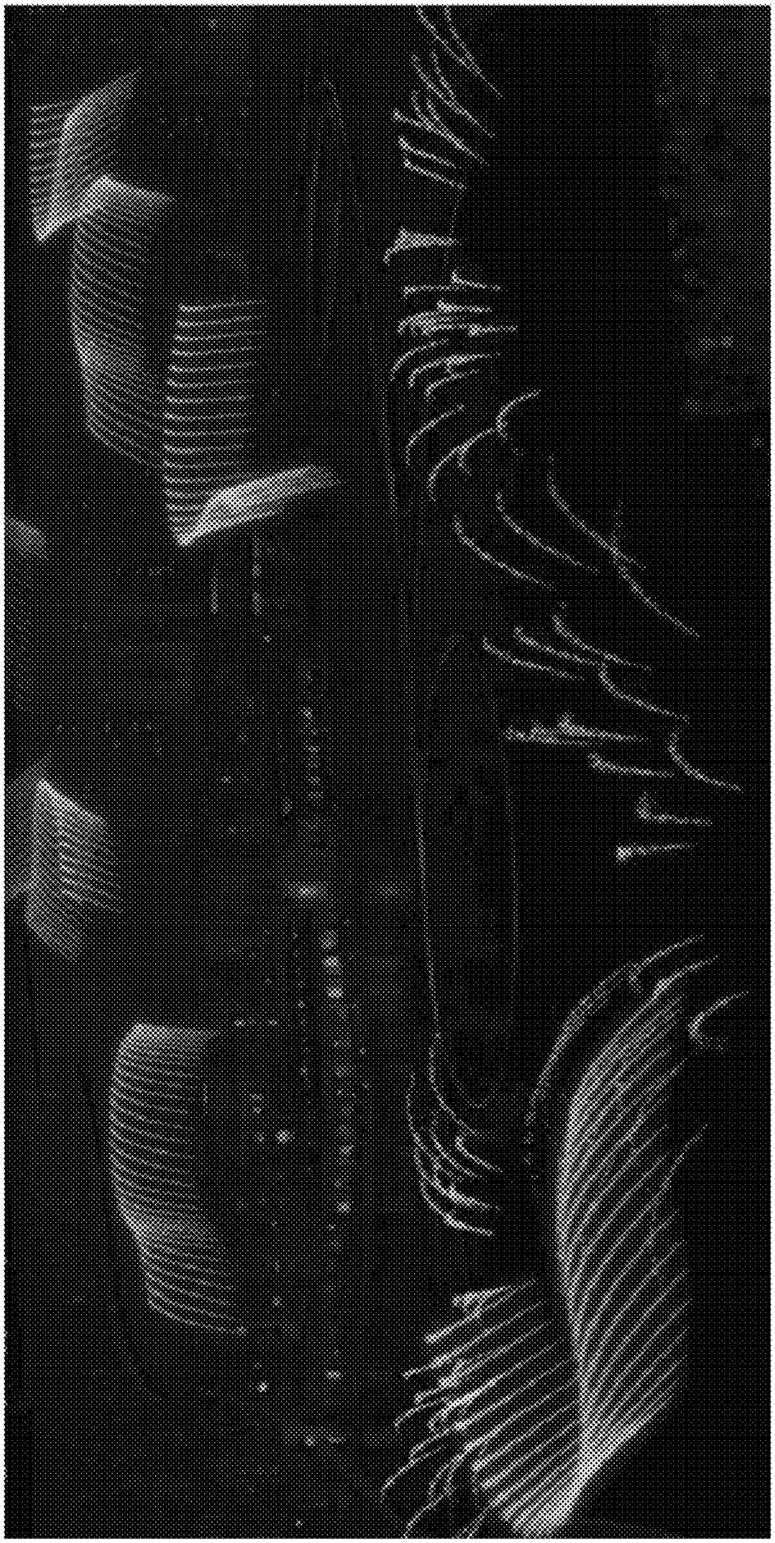
Figure 7K:
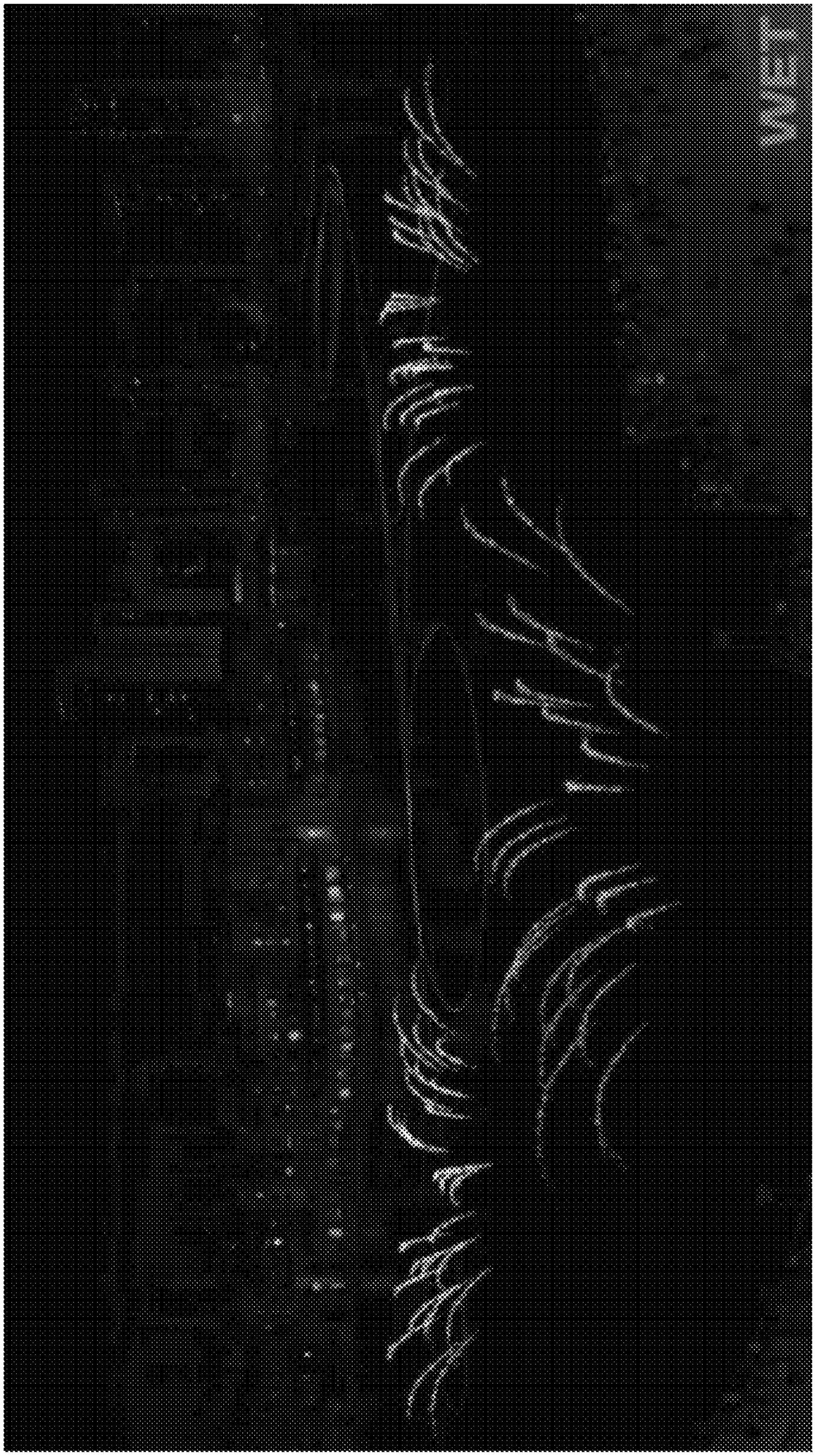
Figure 7L:
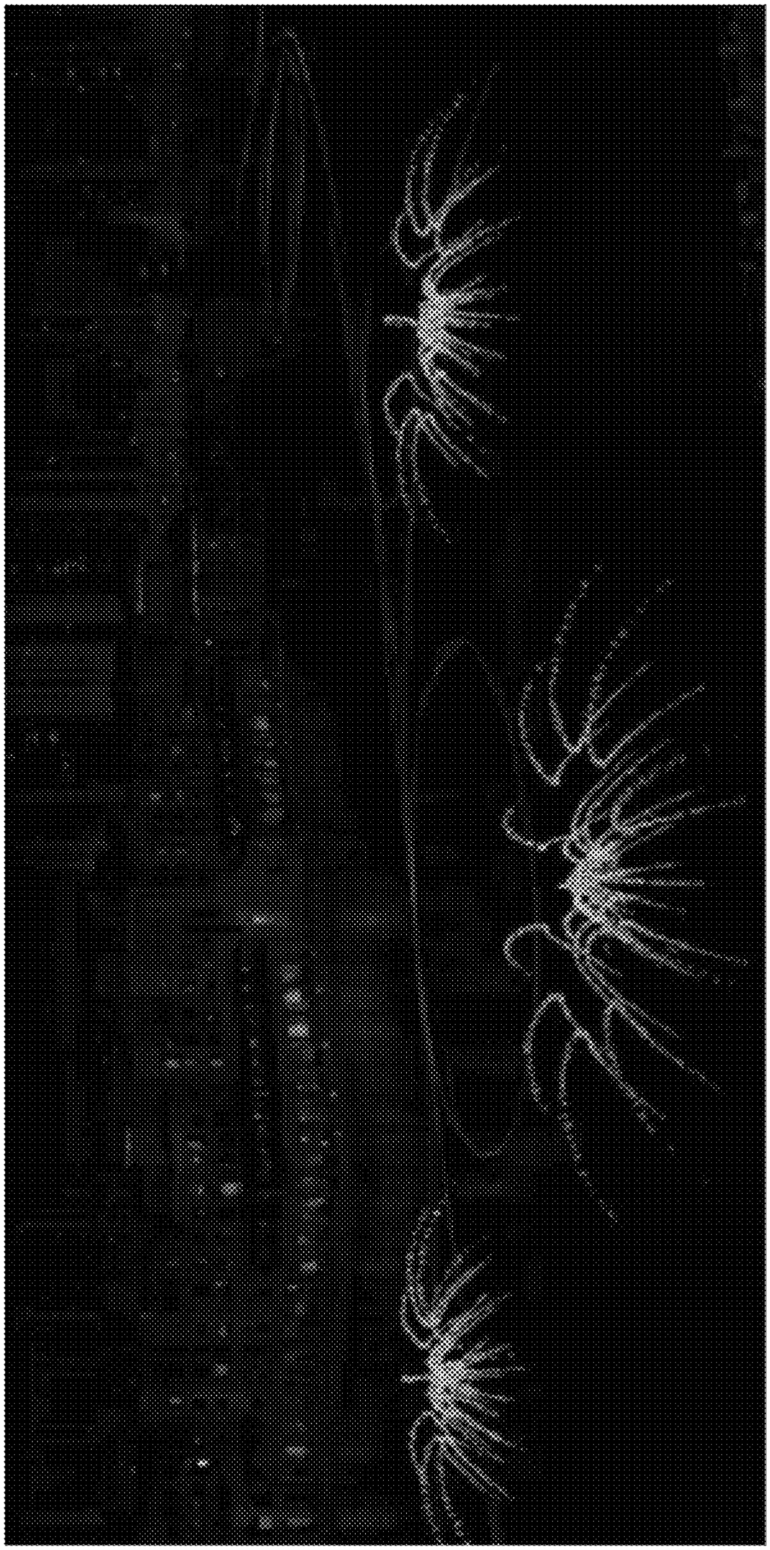

As described above, water delivery device 100 may include boat or other type of vehicle assembly 200 to generally move around reservoir 12, while emitting choreographed water streams 102. Accordingly, as shown in FIG. 5, it is preferred that vehicle assembly 200 include controller unit 220 that may generally control water delivery device 100, propulsion assembly 300 and support assembly 400. Vehicle assembly 200 may also include guidance assembly 500 that may determine the location of vehicle assembly 200 and work with controller unit 220 to generally guide and/or steer vehicle assembly 200 along a desired path to choreographed locations within reservoir 12. Examples of some of the foregoing control and related systems are described in U.S. Provisional Application Ser. No. 62/297,786, filed Feb. 19, 2016, the contents of which are expressly incorporated by reference as if fully set forth herein.

As shown in the block diagram of FIG. 5, controller unit 220 may be configured to operate various assemblies and functions of water delivery device 100. For example, controller 220 may control the emission of water streams 102, e.g., duration, height, pulse, etc. Controller 220 may control boat or vehicle assembly 200 and propulsion assembly 300 to control the movement of vehicle assembly 200 as well as the position of water stream 102. To this end controller 220 may control guidance assembly 500. Controller 220 may also control support assembly 400 so that a counteracting force is provided to coincide with the emission of water streams 102. Controller 220 may also control other components and assemblies of water delivery device 100.

Guidance assembly 500 is now further described. Guidance assembly 500 may include a Global Positioning Satellite (GPS) system and receiver 502 configured with antenna assembly 504 such that it may receive accurate location information and coordinates of its position within reservoir 12 at any moment in real time. Guidance assembly 500 may also include programs, data or other information regarding predetermined choreographed movement sequences for vehicle assembly 200 to perform. Antenna assembly may include the various types of antennas necessary to receive and transmit the frequencies and types of signals necessary for GPS receiver 502 as well as the control signals described in later sections.

An example of how guidance assembly 500 and controller unit 220 may control water delivery device 100 and vehicle assembly 200 along a choreographed sequence of movement is described next. Guidance assembly 500 may receive coordinate and location information from GPS receiver 502 regarding its current location and may compare this information with information from the choreography data regarding where the vehicle assembly 200 should be at the same moment. If there is a discrepancy regarding where the vehicle 200 is and where it should be, this information may be given to controller unit 220 such that controller unit 220 may control propulsion assembly 300 to guide vehicle assembly 200 to the proper location. This may be accomplished by positioning the angle of propulsion assembly 300 (for example motor 302 and propeller 304 or water jet 308) in order to propel vehicle 200 in the correct direction. The velocity of vehicle assembly 200 may also be controlled by controller unit 220 by varying the power supplied to motor 302 or water jet 308.

In addition, controller unit 220 and/or guidance assembly 500 may then compare the current location of vehicle assembly 200 to the next desired location or path of vehicle 200 according to the choreography information, and controller unit 220 may direct vehicle 200 to its next location by controlling propulsion assembly 300 accordingly. This sequence of events may loop continually in real time for the duration of the choreographed movement sequence such that guidance assembly 500 is continually updating the vehicle's position while it and controller unit 220 are directing vehicle 200 along the choreographed path to its next location in display 10. Other sequences of events other than those described in the above example may also be used by controller 220 and guidance assembly 500 to steer, guide and generally control the position of water delivery device 100 and vehicle assembly 200 to accomplish similar results.

Controller unit 220 may also control the emission of water stream 102 out of water delivery device 100 at the same time as guidance assembly 500 positions vehicle 200. For example, controller unit 220 may include choreography information and data for the release of water streams 102 so that the streams 102 may be generated to complement and be generally synchronized with the movement of the vehicle 200. For example, controller unit 220 may control the timing, the height, the width, the type of water bloom and other characteristics of water stream 102 as the vehicle 200 moves about.

As such, it is preferred that vehicle assembly 200 and water deliver device 100 may be controlled to perform complex choreographed sequences of movements and water streams within reservoir 12. Examples of the resulting water stream formations will be described in later sections with reference to FIGS. 6A-6F and 7A-7L.

As stated above, guidance assembly 500 may include programs, data or other information regarding predetermined choreographed movement sequences for vehicle assembly 200 to perform. However, guidance system may also include control receiver 506 that may also be configured with antenna assembly 504. Control receiver 506 may receive commands from a control station 20 (as shown in FIG. 1) that may be located at a distance from vehicle 200, either outside reservoir (as depicted) or in any other location.

Control station 20 may include a remote control device, a radio transmitter, a control console, a computer or any other device that may transmit control signals and remotely control water delivery device 100 and/or water vehicle 200. Control station 20 may send guidance commands in real time to guidance assembly 500 and controller unit 220 to remotely control and generally guide or steer vehicle assembly 200 along a desired path. It should be noted that control station 20 may include a human pilot who may remotely steer or otherwise guide one or more vehicle assemblies 200 by interacting with a steering device such as a joystick, steering wheel, manual controls or other type of interface. It should also be noted that the control station may include a computer or other type of controller that may steer or otherwise guide one or more vehicles 200. In this way, the vehicles 200 may be autonomous. In addition however, the vehicles may be controlled manually and by a controller in combination, for example, by a computer but with manual intervention as required.

In addition, control commands to control the emission of water stream 102 may also be sent to controller 220 such that all aspects of the water streams may also be controlled remotely. As such, the position, direction, velocity and other aspects of vehicle 200, as well as the timing, the height, the width, the type of water stream, and any other aspects of the water stream 102 may also be controlled in real time instead of by a program of predetermined choreographed sequence of movements as in the example above.

Control tower 20 may utilize RF, microwave, millimeter wave, Wi-Fi, Bluetooth™ or any other type of control signals to control vehicle assembly, water delivery device 100 and any other assembly or component of water display 10 as necessary. The control provided by control tower 20 may be automated or manual, or a hybrid thereof.

In addition to controlling the water delivery device 100 and propulsion assembly 300, controller unit 220 may also control support assembly 400 as necessary. For example, controller unit 220 may control the position and direction of bazooka 450 as well as the timing and duration of burst 102A. Alternatively, controller 220 may control the movement of mass 408 along column 406. In one example, controller unit 220 may control the position of bazooka 450 and associated burst 102A as in FIGS. 4A-4D, or control the movement of mass 408 from position A to position B as shown in FIG. 4.

As described above, these support assemblies 400 may be controlled at the same time that water stream 102 is emitted from water delivery device 100. Accordingly, this movement may create a counterbalancing force in the opposite direction as water stream 102 and may thereby decrease the movement of vehicle 200 caused by the force of water stream 102. Controller 220 may also controllably move bazooka 450 back to its default position, or move mass 408 back to position A to reset mass 408. For these movements to be accomplished, the mechanisms that may move bazooka 450, or move mass 408 along column 406, may be electrically controlled such that controller 220 may control them through these means.

In addition, controller unit 220 may control the deployment and positioning of support legs 460 while at the same time controlling the emission of water stream 102. In this way, support legs 460 may be deployed and functional as necessary to provide support to vehicle 200 as water stream 102 is emitted. It should be noted that the electric motors or other mechanisms that may facilitate the deployment, positioning and retraction of legs 460 may be electrically controlled such that controller 220 may control them through these means.

Controller unit 220 may also control propulsion assembly 300 as well as rudders 210, to generally steer and guide water vehicle 200, but to also counter the forces that may be applied to vehicle 200 by the emission of water stream 102. This may be suitable for steady state water streams 102 that may be emitted for some time as opposed to pulsed emissions. For instance, by knowing the angle and direction of water stream 102 and thereby the angle and direction of the force that may result therefrom, controller unit 220 may angle propulsion assembly 300 (for example motor 302 and propeller 304 or water jet 308) in a direction that may be generally opposite to the direction of the recoil force.

Controller unit 220 may then apply power to propulsion assembly 300 such that propulsion assembly 300 may apply a force to vehicle 200 in the opposite direction to the recoil force from water stream 102. In this way, unwanted movement of vehicle 200 due to the recoil force from water stream 102 may be decreased or avoided. The above-described counterbalancing may occur while vehicle assembly 200 is moving such that these adjustments of the angle and power applied to propulsion assembly 300 may be vectorially added or subtracted to the angle and power components that may be guiding vehicle 200 along a desired path.

Controller unit 220 may also control rudders 210 in order to guide vehicle 200 and/or to counter the effects of recoil forces from water stream 102. As rudders 210 cut through the water with the movement of vehicle 200, a force is applied to the rudders by the water that may in turn be applied to vehicle 200. This force may depend on the surface area of the rudders in contact with the water and the angle of the rudders with respect to the water and the direction of the vehicle 200. Therefore, by controlling the depth and angle of the rudders, vehicle 200 may be guided or steered. The depth and the angle of rudders 210 may be electrically controlled such that controller unit 220 may adjust them in order to steer vehicle 200.

In addition, controller unit 200 may further adjust the rudders 210 such that the force applied to the rudders 210 by the water may counter the effect of the recoil force from the emission of water stream 102. In this way, any unwanted movement of vehicle 200 due to the force applied by water stream 102 may be further decreased or avoided. The foregoing may occur while vehicle assembly 200 may be moving such that these adjustments of the depth and angle of rudders 210 may be vectorially added or subtracted to the depth and angle components that may be guiding vehicle 200 along a desired path.

It should be noted that while vehicle assembly 200 has been described above as a pontoon boat 204, vehicle assembly 200 may comprise other types of boats 202 such as single hull boats, additional multi-hull boats such as trimarans, hull boats with keels, and other types of boats. In addition, vehicle assembly 200 may include submersibles and other types of water vehicles. In these other embodiments, boats and/or submersibles, water delivery device 100 and other required assemblies, such as propulsion assembly 300, support assembly 400, guidance assembly 500 and any other assemblies, systems, components and all of the details described above with respect to pontoon boat 204 may also apply. In the case of boats with hulls or submersibles, the various assemblies that may be configured between the pontoons 206 of pontoon boat 204 as described above may be configured within the hull, on the deck or in other positions with respect to the submersible or boat 202. In the case of submersibles, it may be preferable that water nozzle 104 be positioned above water surface 18 when water stream 102 may be emitted.

In addition, it should be noted that display 10 may include a number of water delivery devices 100 configured with vehicle assemblies 200 (and the other assemblies and components as described above) that may all move about reservoir 12. In this way, a fleet of vehicles 200 configured with water delivery devices 100 may be choreographed to move in unison while emitting water streams in an aesthetically stimulating water performance. Each guidance assembly 500 within each individual water vehicle 200 may include the choreography for that particular vehicle 200, such that when all vehicles 200 are controlled in unison the vehicles 200 may move about to form a wide variety of moving and changing forms and shapes of water streams. Lighting systems as well as music may also be included to display 10 to add additional entertaining effects.

In addition, each water delivery device 100 and/or water vehicle 200 may have a unique serial number or other identifying aspect such that each may be identified individually by the predetermined choreography program or by the control commands provided by the control tower 20. In this way, each individual water delivery device 100 and/or vehicle 200 may be controlled individually with respect to the other water delivery devices 100 and water vehicles 200 within the fleet.

Guidance assemblies 500 and/or controller units 220 within each water vehicle 200 may communicate with each other in order to obtain information regarding the location of the other water vehicles 200 within the fleet. In this way, each water delivery device 100 and/or water vehicle 200 may be guided to their correct location with respect to the other water delivery devices 100 and/or water vehicles 200 within the fleet. In addition, guidance assemblies 500 and/or controller units 220 may include collision detection and avoidance systems. By knowing the location, the direction and the speed of each vehicle 200 simultaneously within display 10, potential collisions between vehicles 200 may be foreseen before they occur, and the vehicles 200 may be redirected to avoid any potential collisions. In this way, collisions between vehicles 200 may be avoided during the performance of the choreographed or real time water stream formations. In addition, guidance assemblies 500 and/or controller units 220 may also recognize the boundaries of the reservoir such as the side walls, shores or other boundaries, and may control vehicles 200 from colliding with or otherwise engaging with these boundaries.

In addition, vehicles 200 may include vehicle docks within reservoir that may include battery charging systems such that the vehicles 200 may dock and be charged as necessary to replenish their batter power. These docks may also include fueling systems for vehicles that may require fuel. Vehicles 200 may be guided to their respective docking stations by their guidance assemblies 500 and/or controller units 220.

The water display performances that may be provided by the current invention are now further described with references to FIGS. 6A-6F and 7A-7L. The current invention is not limited to the types of water displays shown therein since these are only examples. Instead, the current invention covers the movement of water delivery devices 100 to provide water streams that appear to move about a reservoir.

FIGS. 6A-6F and 7A-7L show a sequence of pictures whereby a number of water streams are provided as their respective water delivery devices travel about the reservoir. As shown, as devices 100 travel about, the configuration of the water patterns they provide may vary. For example, the heights, angles and locations of the various water streams may vary to form a variety of different patterns and shapes.

Although certain presently preferred embodiments of the invention have been described herein, it will be apparent to those skilled in the art to which the invention pertains that variations and modifications of the described embodiments may be made without departing from the spirit and scope of the invention.

The inventions described above represent various advancements in the field. For example, greater flexibility in overall choreography and visual effects are possible because the water delivery devices 100 are not fixed to an underwater track. Flexibility is also provided where water delivery devices 100 do not rely on tethered utility lines to supply, e.g., water or compressed air. Beyond the movability of the water streams 102 themselves, the visual effect of the vehicles 200 themselves also provide a visual effect.

What is claimed is:

1. A water display for providing a performance of visual effects, comprising:

a body of water having a floor underneath a surface of the water; and a plurality of unmanned movable water delivery devices that each operate without a human aboard, and that each include a nozzle to emit a stream of water, a propulsion assembly, a guidance assembly, and support legs which are positioned in a non-deployed position or a deployed position;

a controller that controls the operation of each of the plurality of unmanned movable water delivery devices according to a predetermined choreographed sequence to provide the performance;

wherein the controller controls the nozzle of each of the plurality of unmanned moveable water delivery devices so that each nozzle is pointed in a non-vertical direction for at least a portion of the performance at the same time or different times so that each emitted stream of water is non-vertical at the same time or different times;

wherein the controller controls the propulsion assembly and the guidance assembly of each of the plurality of unmanned movable water delivery devices so that one or more of the plurality of unmanned movable water delivery devices move about the body of water of the water display, according to the predetermined choreographed sequence, when the support legs are in the non-deployed position; and wherein the support legs engage the floor when positioned in the deployed position and when the nozzle emits the stream of water, so that the support legs counteract the force created by the emitted stream of water.

2. The water display of claim 1, wherein the water display further includes a reservoir that contains the body of water and the plurality of unmanned movable water delivery devices move about the water surface of the reservoir without being fixed to the reservoir.

3. The water display of claim 1, wherein the support legs each are pivotally or telescopically mounted to each of the plurality of unmanned movable water delivery devices; and wherein the support legs are already touching the floor when the stream of water is emitted, or the support legs are separated from the floor by a gap when the stream of water is emitted but thereafter touch the floor.

4. The water display of claim 3, wherein the support legs are pivoted in a direction opposite from the force created by the emitted stream of water.

5. The water display of claim 1, further comprising individual controllers located either on or in each of the plurality of unmanned movable water delivery devices.

6. The water display of claim 1, wherein the nozzle is mounted to a movable mount that is connected to each of the plurality of unmanned movable water delivery devices so that the nozzle is controllably pointed to emit the stream of water in multiple directions according to the predetermined choreographed sequence.

7. The water display of claim 1, wherein the controller is located remote from the plurality of unmanned movable water delivery devices.

8. The water display of claim 1, wherein the controller provides commands to one or more of the plurality of unmanned movable water delivery devices to emit a stream of water according to the predetermined choreographed sequence.

9. The water display of claim 1, wherein the controller provides commands to one or more of the plurality of unmanned movable water delivery devices to position the support legs in the deployed position.

10. The water display of claim 1, wherein the controller provides commands to one or more of the plurality of unmanned movable water delivery devices to move, emit a stream of water and position the support legs in the deployed or non-deployed position.

11. A mobile water delivery device for use during a performance of visual effects with a water reservoir having a water surface and floor at a substantially constant depth below the water surface, comprising:

an unmanned vehicle that operates without a human aboard and that operates according to a predetermined choreographed sequence during the performance, and that includes support legs that are positioned in a non-deployed position or a deployed position according to the predetermined choreographed sequence, that floats and is movable around the water reservoir when the support legs are in the non-deployed position, and that includes a guidance assembly that guides the unmanned vehicle according to the predetermined choreographed sequence;

a propulsion assembly for moving the unmanned vehicle without being fixed to another object or to the floor, and according to the predetermined choreographed sequence provided by the guidance assembly;

a nozzle for emitting a stream of water in a non-vertical direction according to the predetermined choreographed sequence; and a water intake that supplies water to the nozzle;

wherein when the support legs are positioned in the deployed position, the support legs engage the floor so that the unmanned mobile water delivery device counteracts the force created by an emitted stream of water.

12. The mobile water delivery device of claim 11, wherein the unmanned vehicle operates along with additional mobile water delivery devices according to the predetermined choreographed sequence during the performance.

13. The mobile water delivery device of claim 11, wherein the support legs are already touching the floor when the stream of water is emitted, or the support legs are separated from the floor by a gap when the stream of water is emitted but thereafter touch the floor.

14. The mobile water delivery device of claim 11, wherein the propulsion assembly, the nozzle and the support legs are controllable by a controller according to the predetermined choreographed sequence during the performance.

15. The mobile water delivery device of claim 14, wherein the controller is located either on or in the movable water delivery device.

* * * * *